(12) United States Patent
Kani et al.

(10) Patent No.: US 9,021,930 B2
(45) Date of Patent: May 5, 2015

(54) CUTTING DEVICES

(75) Inventors: Toshiyuki Kani, Anjo (JP); Goh Yamamura, Anjo (JP)

(73) Assignee: Makita Corporation, Anjo-shi (JP)

( * ) Notice: Subject to any disclaimer, the term of this patent is extended or adjusted under 35 U.S.C. 154(b) by 916 days.

(21) Appl. No.: 13/086,951

(22) Filed: Apr. 14, 2011

(65) Prior Publication Data

US 2011/0252936 A1    Oct. 20, 2011

(30) Foreign Application Priority Data

Apr. 15, 2010  (JP) ................................ 2010-093849
Apr. 30, 2010  (JP) ................................ 2010-105037

(51) Int. Cl.
*B26D 1/14*     (2006.01)
*B23D 47/00*    (2006.01)
*B27B 5/00*     (2006.01)
*B23D 45/04*    (2006.01)
*B23D 59/00*    (2006.01)

(52) U.S. Cl.
CPC ...... *B26D 1/14* (2013.01); *B23D 47/00* (2013.01); *B27B 5/00* (2013.01); *B23D 45/048* (2013.01); *B23D 59/006* (2013.01)

(58) Field of Classification Search
CPC ................................. B27B 5/29; B26D 3/02
USPC .......... 83/162, 471.2, 471.3, 469, 177, 100, 83/472, 473, 478, 109; 30/273, 275, 30/275.4, 276, 286, 369, 374, 388, 390, 30/391

See application file for complete search history.

(56) References Cited

U.S. PATENT DOCUMENTS

| | | | |
|---|---|---|---|
| 5,203,245 A * | 4/1993 | Terpstra | 83/397 |
| 5,782,153 A | 7/1998 | Sasaki et al. | |
| 5,927,171 A | 7/1999 | Sasaki et al. | |
| 6,742,425 B2 * | 6/2004 | Oktavec et al. | 83/100 |
| 7,069,831 B2 * | 7/2006 | Chang | 83/100 |
| 2005/0160892 A1* | 7/2005 | Bergmann | 83/100 |
| 2006/0107810 A1* | 5/2006 | Chiu | 83/100 |
| 2006/0185484 A1 | 8/2006 | Sasaki et al. | |

(Continued)

FOREIGN PATENT DOCUMENTS

| | | |
|---|---|---|
| DE | 20 2004 000 983 U1 | 4/2005 |
| EP | 0 601 805 A1 | 6/1994 |

(Continued)

OTHER PUBLICATIONS

Apr. 8, 2013 Chinese Office Action issued in Chinese Patent Application No. 201110097103.0 (with translation).

(Continued)

*Primary Examiner* — Phong Nguyen
(74) *Attorney, Agent, or Firm* — Oliff PLC

(57) ABSTRACT

A cutting device includes a cutting unit having a rotary blade, a table for placing a workpiece thereon, and a support device vertically movably supporting the cutting unit relative to the table. The cutting unit includes a blade case. The blade case covers an upper portion of the rotary blade and has a dust discharge member for discharging dust produced at a cutting region. The cutting device further includes a dust guide device disposed on at least one of an upstream side and a downstream side of the dust discharge member with respect to a flow of the dust. A position of at least a part of the dust guide device changes relative to the dust discharge member according to change of the vertical position of the cutting unit.

11 Claims, 25 Drawing Sheets

(56) References Cited

U.S. PATENT DOCUMENTS

2009/0235794 A1  9/2009  Inai
2009/0249929 A1  10/2009 Sasaki et al.
2011/0011229 A1  1/2011  Lawlor et al.

FOREIGN PATENT DOCUMENTS

| EP | 1 614 511 A1 | 1/2006 |
|---|---|---|
| EP | 1 625 908 A1 | 2/2006 |
| EP | 1 852 227 A2 | 11/2007 |
| JP | U-03-108401 | 11/1991 |
| JP | A-7-276302 | 10/1995 |
| JP | A-8-323706 | 12/1996 |
| JP | A-2006-027104 | 2/2006 |
| JP | A-2006-88539 | 4/2006 |
| JP | A-2007-118383 | 5/2007 |
| JP | A-2008-073920 | 4/2008 |
| WO | WO 2008-035810 A1 | 3/2008 |

OTHER PUBLICATIONS

Extended European Search Report issued in European Patent Application No. 11162441.7 dated Jul. 14, 2011.
Oct. 29, 2013 Office Action issued in Japanese Patent Application No. 2010-093849 (with translation).
Oct. 29, 2013 Office Action issued in Japanese Patent Application No. 2010-105037 (with translation).
Oct. 13, 2014 Office Action issued in European Patent Application No. 11162441.7.

\* cited by examiner

FIG. 2

REARWARD ←——→ FORWARD

REARWARD ←——→ FORWARD

CUTTING DEVICES

This application claims priority to Japanese patent application serial numbers 2010-0849 and 2010-105037, the contents of which are incorporated herein by reference.

BACKGROUND OF THE INVENTION

1. Field of the Invention

The present invention relates to cutting devices having tables and configured to be able to collect cutting chips or dust produced during a cutting operation.

2. Description of the Related Art

A cutting device having a table and known as a table circular saw has a table and a cutting unit vertically movably supported by the table via a support device disposed at a rear portion of the table. The cutting unit includes a circular rotary blade rotatably driven by a motor. An upper portion of the rotary blade is covered by a blade case. A lower portion of the rotary blade is covered by a movable cover. The movable cover is opened and closed in response to the vertical movement of the cutting unit. Thus, as the cutting unit moves downward, the movable cover is opened to gradually expose the lower portion of the rotary blade, and the exposed lower portion of the cutting blade cuts into a workpiece. As the cutting unit moves downward, the movable cover is gradually closed to cover the cutting edge of the rotary blade, for example, by a biasing force of a spring.

The rotary blade cuts into a workpiece in a direction from the upper side toward the lower side, so that a cutting operation is performed. Therefore, cutting chips produced by the cutting operation is blown upward from a cut portion. If the cutting chips are scattered around, a working environment may be degraded. In addition, if the cutting chips are deposited on the cut portion, it may be hard to see a cutting line marked on the workplace or to see the cut portion, and therefore, there is a possibility of obstructing the cutting operation. Therefore, in this kind of cutting devices, there have been proposed various devices for collecting or removing cutting chips produced around the cut portion as the cutting operation is performed.

For example, Japanese Laid-Open Patent Publication No. 2006-27104 discloses a technique of mounting a U-shaped dust guide member to a lower portion of the blade case to extend downwardly therefrom within a range that does not interfere with the workplace, so that the cutting chips produced at the cut portion are guided to a dust discharge member disposed on the upper side via the dust guide member. In this publication, a fixed-type dust guide member is disclosed as the dust guide member. A dust guide member disclosed in Japanese Laid-Open Utility Model Publication No. 3-108401 is vertically pivotally supported on the lower portion of the blade case and is configured to contact the upper surface of the workpiece for covering around the out portion with more smaller clearance therewith to further improve the collecting efficiency of the dust toward the dust discharge member.

Japanese Laid-Open Patent Publication No. 2008-73920 discloses a technique in which a dust collecting member extending downward from the blade case for guiding the cutting chips toward the dust discharge member is vertically moved in conjunction with the vertical movement of the cutting unit.

Further, according to Japanese Laid-Open Utility Model Publication No. 3-108401 noted above and EP0601805A, the dust discharge member is provided at the blade case and communicates with a dust container, so that the flow of air produced by the rotation of the rotary blade is introduced into the dust container via the dust discharge member.

Further, in this kind of cutting devices, the dust container is supported by the blade case by being connected to the dust discharge member of the blade case in communication therewith. Therefore, when the cutting unit vertically pivots, it may be susceptible that this vertical pivoting movement influences the dust container. For example, in the case that the cutting unit is positioned at its uppermost position, the transfer path between inside of the dust container and the dust discharge member may be positioned substantially horizontally.

The above known dust collecting techniques still have various problems. In the case of the dust guide member disclosed in Japanese Laid-Open. Patent Publication No. 2006-27104, because the dust guide member is fixed to the lower portion of the blade case to extend therefrom, there is a limitation in increasing its downwardly extending distance due to the necessity of avoiding interference with other parts, such as a fence for positioning the workpiece. As a result, in particular in the case of cutting a workpiece having a thin thickness, the dust guide member is brought to be positioned away from the cut portion. Therefore, it is hard to always achieve a high dust collecting efficiency.

In the case of the dust guide member disclosed in Japanese Laid-Open Utility Model Publication No. 3-108401, the dust collecting member is supported to be able to vertically pivot freely within a predetermined angular range, and therefore, the lower pivotal end is fixed. For this reason, it is hard to cope with change of the cut portion according to the change of the cutting amount of the cutting blade into the workpiece and to eventually cope with change of the blowing direction of the cutting chips.

Although the dust guide member disclosed in Japanese Laid-Open Patent Publication No. 2008-73920 is configured to vertically move in conjunction with the vertical movement of the cutting unit, its moving direction is a direction of oppositely retracting upward or a direction away from the cut portion in order to avoid interference with the workpiece. As a result, the dust collecting efficiency is low in particular in the case that the workpiece has a thin thickness.

Further, in the case of Japanese Laid-Open Utility Model Publication No. 3-108401 and EP0601805A1, the following problem may exist. In order to carry about the cutting device after the cutting operation, the cutting unit may be moved to the lowermost position and locked at this position. In such a case, the path from inside of the dust container to the dust discharge member may be inclined downward. Therefore, if the cutting device locked as described above is carried about, the cutting chips may drop from the dust discharge member onto the table by the gravity force. When this occurs, the work environment may be degraded and the cutting operation may be obstructed.

Therefore, there is a need in the art for a cutting device having a further improved dust guide device.

SUMMARY OF THE INVENTION

According to the present teaching, a cutting device includes a cutting unit having a rotary blade, a table for placing a workpiece thereon, and a support device vertically movably supporting the cutting unit relative to the table. The cutting unit includes a blade case. The blade case covers an upper portion of the rotary blade and has a dust discharge member for discharging dust produced at a cutting region. The cutting device further includes a dust guide device disposed on at least one of an upstream side and a downstream side of the dust discharge member with, respect to a flow of the dust. A position of at least a part of the dust guide device changes relative to the dust discharge member according to change of the vertical position of the cutting unit.

BRIEF DESCRIPTION OF THE DRAWINGS

FIG. 2 is a left side view of the entire cutting device shown in FIG. 1 and showing the cutting unit in the state of being positioned at a lowermost position and at the front end slide position on the front most slide;

DETAILED DESCRIPTION OF TEE INVENTION

Figure 1:
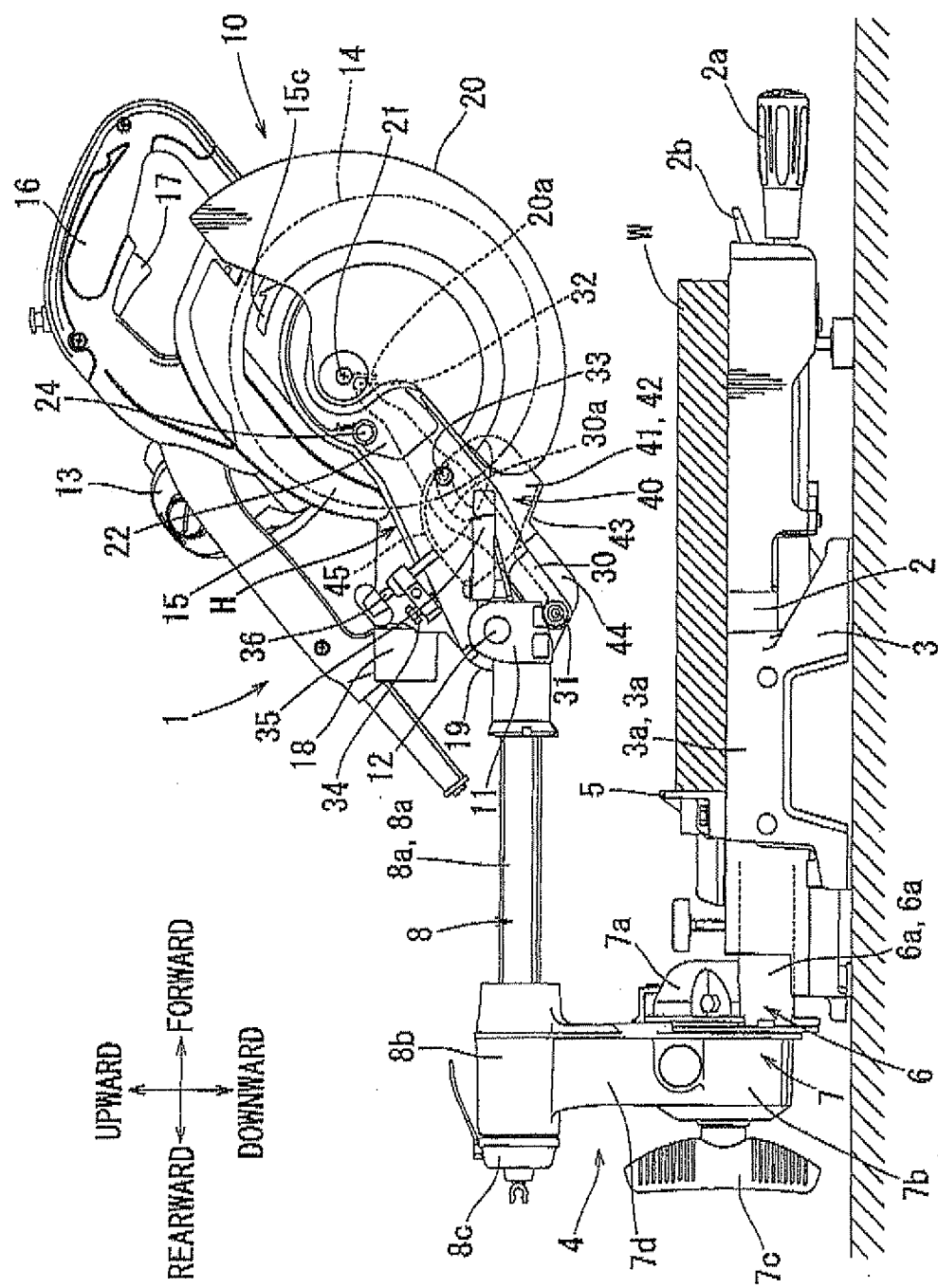
FIG. 1 is a left side view of an entire cutting device according to a first example and showing a cutting unit in the state of being positioned at an uppermost position and at a front end slide position on the front most slide.

Each of the additional features and teachings disclosed above and below may be utilized separately or in conjunction with other features and teachings to provide improved cutting devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings. Various examples will now be described with reference to the drawings.

In one representative example, a cutting device includes a cutting unit having a rotary blade, a table for placing a workpiece thereon, and a support device vertically movably supporting the cutting unit relative to the table. The cutting unit includes a blade case covering an upper portion of the rotary blade and having a dust discharge member, a movable cover covering a lower portion of the rotary blade and opened and closed in response to the up movement of the cutting unit. The cutting device further includes a dust guide device including a dust guide member covering an edge portion of the rotary blade exposed as the movable cover is opened, the dust guide member serving to guide dust produced at a cutting region toward the dust discharge member of the blade case. The cutting device further includes a dust guide moving device moving the dust guide member such that the dust guide member moves in a direction of extending downward from a lower portion of the blade case as the cutting unit moves downward.

With this arrangement, the dust guide member moves downward in response to the downward movement of the cutting unit, and therefore, it is possible to collect cutting chips or dust at a position closer to the cut portion. As a result, it is possible to further improve the efficiency of collecting dust toward the dust discharge member.

The dust guide moving device may allow the dust guide member to retract upward during the downward movement of the cutting unit or during stopping of the cutting unit. With this construction, in the state that the dust guide member contacts an upper surface of a workpiece, such as that a large thickness workpiece, the rotary blade can cut into a workpiece by moving the cutting unit downward. Therefore, it is possible to further reliably cover the surroundings of the cut portion by the dust guide member. Hence, it is possible to further improve the efficiency for collecting dust toward the dust discharge member.

The dust guide moving device may move the dust guide member toward the rotary blade as the cutting unit moves downward. With this construction, even in the case that the distance between the cut portion and the dust discharge member is relatively large, for example, when a thin workpiece, such a wooden floor material, is to be cut, the dues guide member moves to be closer to the cutting edge of the rotary blade, so that the dust can be collected at a position closer to the cut portion. As a result, it is possible to further efficiently guide the dust toward the dust discharge member.

The cutting device may further include a link arm interposed between the movable cover and the support device. Through the link arm, the movable cover is opened in response to the downward movement of the cutting unit and is closed in response to the upward movement of the cutting unit. The link arm has one end vertically pivotally supported on the cutting unit and has the other end engaging with the movable cover. The link arm has a guide recess disposed at a midway position in a longitudinal direction thereof. The guide recess engages a guide projection provided at the blade case, so that the link arm shifts vertically to open and close the movable cover in response to the vertical movement of the cutting unit. The dust guide device may include a guide wall provided on the dust guide member and engaging the guide projection from an upper side, so that, while being allowed to retract upward, the dust guide member shifts downward and moves toward the edge portion as the guide projection shifts downward.

With this arrangement, in the cutting device, the dust guide member is moved by utilizing a part of a mechanism for opening and closing the movable cover in response to the vertical movement of the cutting unit. Therefore, it is possible to improve the dust collecting efficiency, while the construction being simplified. In addition, by suitably setting the configuration of the guide wall portion engaging the guide projection from the upper side, it is possible to arbitrary set a timing and a path of movement of the dust guide member.

The cutting device may further include a leaf spring biasing the dust guide member in a downwardly pivoting direction. With this arrangement, it is possible to reliably move the dust collecting member downward and closer to the cutting edge. Therefore, the dust can be reliably collected.

The leaf spring may be configured to guide the dust toward the dust discharge member. With this arrangement, the cutting chips or the like collected by the dust guide member can be reliably guided to the dust discharge member by the leaf spring, so that it is possible to realize a more reliable collection of the dust.

The dust guide device may further include a lower auxiliary guide member vertically pivotally supported and extending downward as the movable cover is opened. With this arrangement, even in the case that a guide body of the dust guide member may not contact the upper surface of a workpiece, for example, when a thin workpiece, such as a wooden floor material is to be cut, the cutting chips can be efficiently collected because the lower auxiliary guide member extends downward from the guide body to contact the upper surface of the workpiece.

The lower auxiliary guide member may include an escape guide portion that slidably contacts the workpiece for moving the lower auxiliary guide member upward as the cutting unit moves in a direction parallel to a surface of the workpiece. This arrangement is advantageous in particular in the case that the cutting device is a slide circular saw, in which the cutting unit can slide in a direction parallel to the surface of a workpiece in addition to the vertical movement for enabling a cutting work by a longer distance. Thus, when the cutting operation is performed by sliding the cutting unit in the direction parallel to the upper surface of the workpiece after downwardly moving the cutting unit, the lower auxiliary guide member can be smoothly guided toward the upper surface of the workpiece though the escape guide portion. Therefore, it is possible to efficiently collect the dust by using the lower auxiliary guide member while the cutting unit smoothly slidably moving.

The dust guide device may further include an upper auxiliary guide member vertically pivotally supported and movable upward relative to the dust guide member to guide the dust toward the side of the dust discharge member as the dust guide member pivots downward. With this arrangement, even in the case that the guide body of the dust guide member is moved downwardly by a large distance, for example, when a thin workpiece is cut, the upper auxiliary guide member pivots to extend upward from the guide body to ensure a continuous dust collecting channel between the guide body and the dust discharge member, so that the dust can be efficiently collected.

In another representative example, a cutting device includes a cutting unit having a rotary blade, a table for placing a workplace thereon, a support device vertically movably supporting the cutting unit relative to the table. The cutting unit includes a blade case covering an upper portion of the rotary blade and having a dust discharge member for discharging dust produced at a cutting region. The cutting device further includes a dust guide device for guiding the dust discharged from the dust discharge member into a dust container. The dust guide device includes a first transfer passage forming member having one end connected to the dust container, and a second transfer passage forming member having one end connected to the dust discharge member. The first transfer passage forming member is fixedly supported on the support device. The second transfer passage forming member is fixedly mounted to the blade case. The other end of the first transfer passage forming member and the other end of the second transfer passage forming member are connected to be movable relative to each other as the cutting unit moves vertically.

According to the cutting device of this example, the connecting condition between the first transfer passage forming member and the second transfer passage forming member can be maintained when the vertically moving cutting unit is at any of the vertical position. Here, when the cutting unit is positioned at its lowermost position, only the second transfer passage forming member of transfer passage forming components for transferring the cutting chips serves to be inclined downward toward the dust discharge member. In other words, because the first transfer passage forming member is fixedly supported on the support device, this member is held in position regardless of the vertical position of the cutting unit. Therefore, even in that case that the flow of air from the dust discharge member to the dust container (e.g., a dust box) has been stopped due to stopping of rotation of the rotary blade, only the second transfer passage forming member of the transfer passage forming components may serve as the transfer passage forming component in which the cutting chips are susceptible of receiving the influence of the gravity.

Therefore, even in the case that the rotation of the rotary blade is stopped and the cutting unit is locked at the lowermost position for carrying about the cutting device after the cutting operation, it is possible to minimize the occurrence of dropping of the cutting chips from the dust discharge member onto the table by the gravity.

The dust guide device may further include a third transfer passage forming member having a dust collecting opening for receiving a part of the dust produced during machining of the workpiece and scattering outside of the blade case without entering the blade case. The third transfer passage forming member is connected to the first transfer passage forming member, so that the part of the dust is drawn into the first transfer passage forming member from the third transfer passage forming member.

With this arrangement, the third transfer passage forming member is connected to the first transfer passage forming member for drawing the dust toward the first transfer passage forming member via the dust collecting opening, and the dust collecting opening receives a part of the dust produced during the cutting operation of the workpiece and scattered to the outside of the blade case without entering the blade case. Therefore, for example, when a thin workpiece is selected to be cut, cutting chips that do not enter the blade case but scatters to the outside of the blade case can be drawn from the third transfer path forming member having the dust collecting opening into the first transfer path forming member. Therefore, even in the case that a thin workpiece is cut, the cutting chips produced at the cutting region during the cutting operation can be favorably collected. As a result it is possible to maintain a work environment at a favorable condition, and it is possible to favorably maintain the operability.

The first transfer passage forming member may extend horizontally. With this arrangement, the cutting chips within the first transfer passage forming member may not be dropped due to influence of the gravity force. Therefore, the cutting chips within only the second transfer passage forming member may be possible to be dropped from the dust discharge member onto the table by the gravity. Therefore, it is possible to minimize the occurrence of dropping of the cutting chips.

The second transfer passage forming member may extend horizontally in the state that the cutting unit is positioned at such a position that the dust discharge member takes an uppermost position. With this arrangement, it is possible to further minimize the cutting chips that may be dropped.

The second transfer passage farming member may be connected to the first transfer passage forming member by being movably fitted into the first transfer passage forming member. As the position of the dust discharge member relative to the dust container changes, the fitting amount of the second transfer passage forming member into the first transfer passage forming member changes to maintain the state of connecting the second transfer passage forming member to the first transfer passage forming member. Thus, the fitting amount of the second transfer passage forming member into the first transfer passage forming member varies with change of the relative position of the dust discharge member to the dust container. Therefore, the number of parts necessary for constituting the first and second transfer passage forming members can be two. Hence, it is possible to reduce the number of parts necessary for constituting the first and second transfer passage forming members, so that the manufacturing cost can be reduced.

An outer diameter of the second transfer passage forming member may be formed to be smaller than an inner diameter of the first transfer passage forming member, so that the second transfer passage forming member is slidably fitted into the first transfer passage forming member.

With this arrangement, a fitting clearance between the second transfer passage forming member and a second transfer passage forming member may be positioned adjacent the outer circumference of the second transfer passage forming member and may be opened in a direction opposite to the direction of flow of air produced by the rotation of the rotary blade. Therefore, it is possible to reduce leakage of flow of air flowing from the second transfer passage forming member into the first transfer passage forming member and produced by the rotation of the rotary blade. Eventually, it is possible to reduce leakage of cutting chips to the outside.

The second transfer passage forming member may extend in an extending direction of the first transfer passage forming member in the state that the cutting unit is positioned at such a position that the dust discharge member takes an uppermost position. With this construction, when the dust discharge member takes the uppermost position, the second transfer passage forming member extends in line with the first transfer passage forming member. Therefore, it is possible to increase the horizontal length of the transfer path. As a result, even in the case that the rotation of the rotary blade is stopped and no flow of air is produced by the rotary blade, it is possible to inhibit the cutting chips within the transfer passages from being discharged from the dust collecting opening to the side of the blade case.

The first transfer passage forming member may include an internal rib provided therein and extending in a direction opposite to an extending direction of the third transfer passage forming member. With this arrangement, the internal rib can block the cutting chips within the first transfer passage forming member not to move backward through the third passage forming member and to be discharged to the outside via the dust collecting opening. Therefore, also with this arrangement, it is possible to inhibit the cutting chips within the transfer passages from being discharged to the outside.

Various examples will now be described with reference to FIGS. 1 to 29. First, a first example will be described. FIG. 1 shows a cutting device 1 having a dust guide device according to the first example. The cutting device 1 of this example is configured as a slide-type cutting device. The cutting device 1 generally includes a table 2 for placing a workpiece W thereon, a base 3 rotatably supporting the table 2, a support device 4 disposed at a rear portion of the table 2, and a cutting unit 10 supported on the upper side of the table 2 by the support device 4.

The operator may be positioned on the right side of the cutting device 1 as viewed in FIG. 1. In the following explanation, with respect to the sides or directions of the parts and constructions, the side or direction as viewed from the side of the operator (right side in FIG. 1) will be referred to as a front side or a forward direction, and the side or the direction of proceeding the cutting operation (left side in FIG. 1) will be referred to as a rear side or a rearward direction. Also with respect to the right and left sides or the rightward and leftward directions, these sides and directions are determined with reference to the position of the operator. Therefore, for example, the upper and lower sides in FIG. 5 will be explained as the right and lefts sides.

The table 2 is horizontally rotatably supported on the base 3. The rotational position of the table 2 can be changed by loosening a lock knob 2b or releasing a lock lever 2b. By changing the rotational position of the table 2, it is possible to cut a workpiece W at different angles as viewed in a plan view. A positioning fence 5 is disposed on the upper side of the table 2 for positioning the workpiece W relative to the upper surface of the table 2. The positioning fence 5 is mounted to left and right auxiliary tables 3a and 3b so as to extend therebetween. The left and right auxiliary tables 3a and 3b extend laterally from the left and right sides of the table 2. A small clearance is formed between the positioning fence 5 and the upper surface of the table 2.

The support device 4 disposed at the rear portion of the table 2 has two lower and upper slide mechanisms 6 and 8 and a left and right pivot mechanism 7. The lower slide mechanism 6 includes a pair of left and right slide bars 6a that are supported by the rear portion of the table 2 so as to be slidable in forward and rearward directions. The left and right pivot mechanism 7 is supported by the rear portions of the slide bars 6a. The left and right pivot mechanism 7 includes a pivot receiver member 7a and a pivot support member 7b coupled to the pivot receiver member 7a via a pivotal shaft (not shown) extending in the forward and rearward direction. The pivotal position of the pivot support member 7b relative to the pivot receiver member 7a can be adjusted by loosening a fixing lever 7c. The left and right pivot mechanism 7 has a positioning mechanism disposed therein. The positioning mechanism is configured to be able to accurately rapidly set a vertical cutting position and left and right 45° inclined cutting positions. The positioning mechanism is configured to be able to also set any other desired cutting positions than these positions. Inclining the cutting unit 10 by using the left and right pivot mechanism 7 enables to perform an inclined cutting operation for cutting the workpiece W at an inclined angle by a rotary blade 14.

A support arm 7d extends upward from the upper portion of the pivot support member 7b. The upper portion of the support arm 7d supports the upper slide mechanism 8. Similar to the lower slide mechanism 6, the upper slide mechanism 8 includes a pair of slide bars 8a. The slide bars 8a are supported by a slide support portion 8b provided on the upper portion of the support arm 7d so as to be movable in the forward and rearward direction in parallel to each other. The upper slide mechanism 6 and the lower slide mechanism 8 can slide parallel to and independently of each other. The rear ends of the slide bars 8a are coupled to each other by a rear end connection block 8c. The front ends of the slide bars 8a are coupled to each other via a unit support bracket 11. The unit support bracket 11 vertically pivotally supports the cutting unit 10 via a unit support shaft 12. The cutting unit 10 is biased upward by a spring (not shown). FIG. 1 shows the state where the cutting unit 10 is held at a rest position by the biasing force of the spring.

As the cutting unit 10 pivots downward, the rotary blade 14 may cut into the workpiece W, so that a cutting operation of the workpiece W can be performed. With the cutting unit 10 pivoted downward, the cutting unit 10 can be slid rearwardly in a direction parallel to the upper surface of the workpiece W with the aid of the upper and lower slide mechanisms 6 and 8. Therefore, it is possible to cut the workpiece W, in particular when the workpiece has a large size.

The cutting unit 10 has a unit case H. The unit case H includes a support portion 19 disposed on the rear side, a dust discharge member 18 disposed on the upper side of the rear support portion 19, and a blade case 15 positioned on the front side. The rear support portion 19, the dust discharge member 18 and the blade case 15 are formed integrally with each other. The support portion 19 of the unit case H is pivotally supported by the unit support bracket 11 via the unit support shaft 12. An electric motor 13 is mounted to the right side portion of the unit case H. The rotary blade 14 has a circular configuration and is rotatably supported within the blade case 15 at the front portion of the unit case H. The blade case 15 has a semicircular shape and covers the upper half of the rotary blade 14. The rotary blade 14 is rotated by the electric motor 13 as a drive source. The rotary blade 14 rotates in a direction indicated by an outline arrow 15c that is marked on a left side portion 15L of the blade case 15. In FIG. 1, the rotary blade 14 rotates in a clockwise direction.

A handle portion 16 is formed integrally with a right side portion 15R of the unit case H and can be grasped by the operator. The handle portion 16 has a loop shape and has a switch lever 17 mounted at the inner circumferential side of the loop shape. When the operator grasps the handle portion 16 and pulls the switch lever 17 by fingers of his or her hand grasping the handle portion 16, the electric motor 13 starts to rotate the rotary blade 14. Also, the operator can pivot the cutting unit 10 upward and downward by grasping the handle portion 16.

The lowermost position (lower dead center) of the cutting unit 10 providing a maximum cutting depth is restricted through contact between a stopper bolt 34 mounted to the support portion 19 of the case body H and a stopper block 35 provided on the unit support bracket 11. The lowermost position of the cutting unit 10 can be finely adjusted by adjusting the tightening amount of the stopper bolt 34. In this example, in addition to the stopper bolt 34, a stopper bolt 36 having a length longer than the stopper bolt 34 is provided on the front side of the stopper bolt 34 and can be used for a grooving operation. Therefore, any one of the stopper bolts 34 and 36 can be selectively used depending on the mode of the cutting operation.

The dust discharge member 18 disposed at the rear portion of the blade case 15 defines a passage that communicates within the blade case 15. Although not shown in the drawings, a dust bag or the like can be mounted to the dust discharge member 18. Alternatively, a dust collecting hose of a dust collecting device may be connected to the dust discharge member 18. Therefore, cutting chips or the like blown into the blade case 15 can be collected into the dust bag or the like via the dust discharge member 18.

Figure 5:
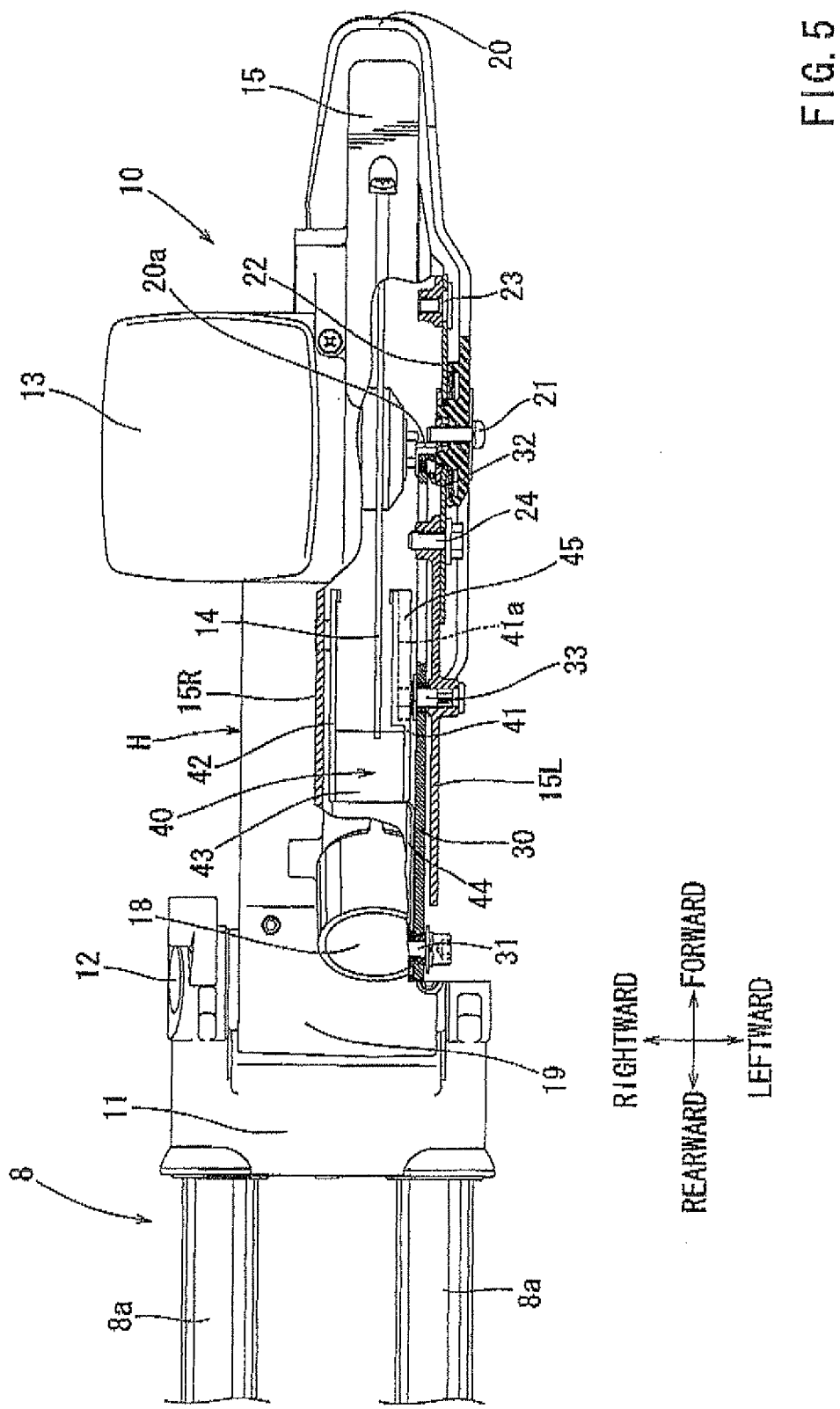
FIG. 5 is a plan view of the cutting unit having a dust collecting guide device shown in FIG. 1.

The lower half of the rotary blade 14 protrudes downward from the blade case 15. A movable cover 20 covers the lower half of the rotary blade 14 protruding downward from the blade case 15. The movable cover 20 is vertically pivotally supported by the blade case 15 via a support shaft 21. An auxiliary plate 22 is mounted to the left side portion 15L of the blade case 15 for closing a portion around the rotation center of the rotary blade 14. As shown in FIG. 5, the auxiliary plate 22 is vertically pivotally supported via a support shaft 23, so that the auxiliary plate 22 can be positioned between a close position for closing the portion around the rotation center of the blade case 14 and an open position uncovering this portion. The auxiliary plate 22 can be fixed at the close position by a fixing screw 24. As the fixing screw 24 is loosened, the auxiliary plate 22 pivots downward about the support shaft 23, so that the auxiliary plate 22 moves to the uncover position. By positioning the auxiliary plate 22 to the uncovering position, the operation for mounting and removing the rotary blade 14 can be easily performed. The movable cover 20 is vertically pivotally supported by the auxiliary plate 22 via the support shaft 21.

Although not shown in the drawings, a torsion spring is interposed between the movable cover 20 and the blade case 15, so that the movable cover 20 is biased in the closing direction by the torsion spring.

The movable cover 20 is opened and closed in conjunction with the vertical movement of the cutting unit 10 by way of a link arm 30. The rear end of the link arm 30 is supported on the unit support bracket 11 via a support shaft 31 that is positioned on the lower side of the support shaft 12 of the cutting unit 10. The distance between the support shaft 31 and the support shaft 12 is set to be able to open and close the movable cover 20 at suitable timing in response to the vertical movement of the cutting unit 10.

The link arm 30 is vertically pivotally supported via the support shaft 31. The link arm 30 extends forwardly from the support portion 19 of the case body H to a position proximal to the rotation center of the movable cover 20 along the inner side of the left side portion 15L of the blade case 15. An engaging roller 32 is rotatably mounted to the front end of the link arm 30 and abuts to an engaging plate portion 20a disposed at a position proximal to the rotation center of the movable cover 20.

Figure 2:
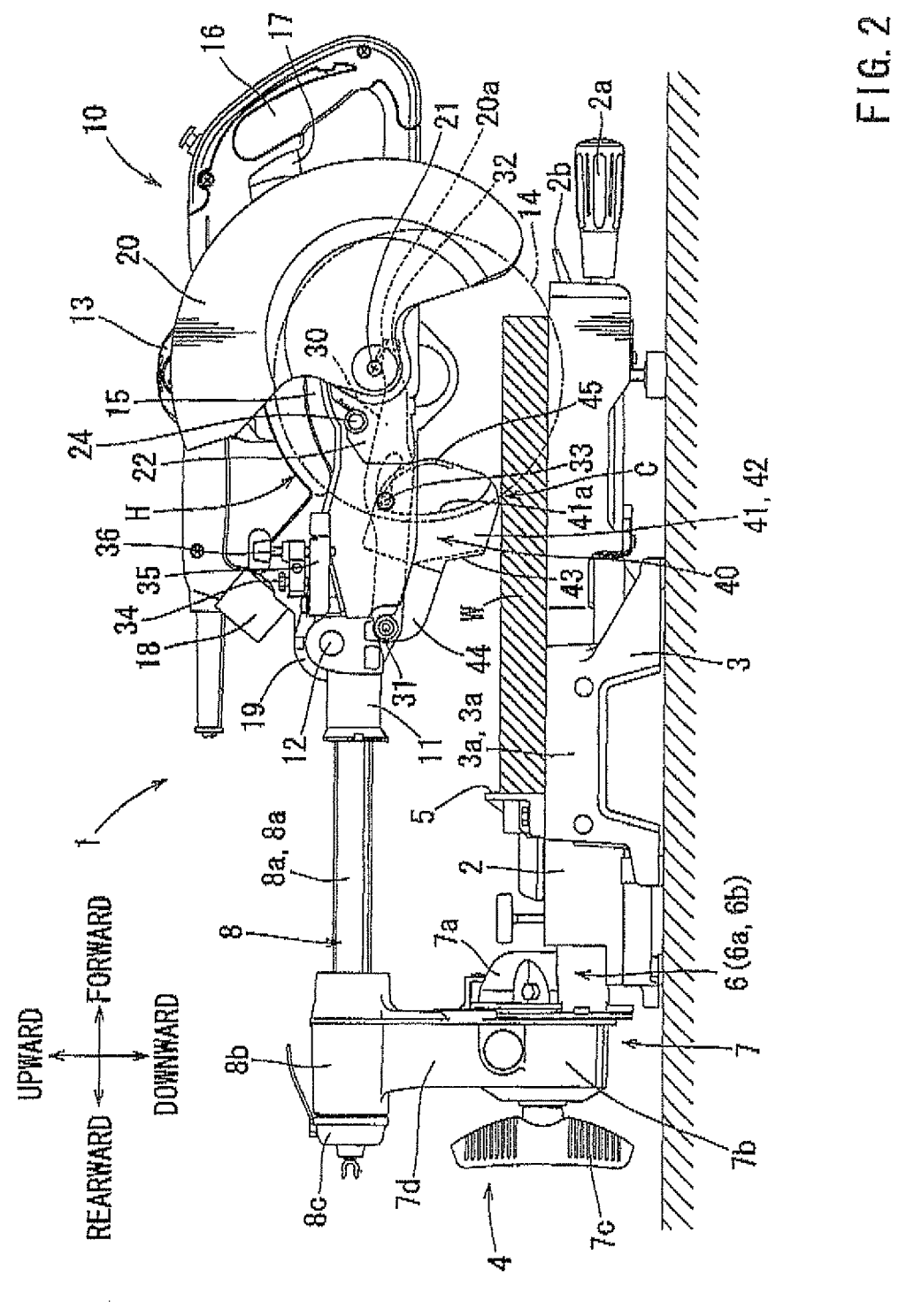

A guide groove 30a is formed in the central portion with respect to the longitudinal length of the link arm 30. The guide groove 30a has an upwardly convex arc shape. A guide projection 33 is inserted into the guide groove 30a. The guide projection 33 is mounted to or formed on the inner surface of the left side portion 15L of the blade case 15 so as to protrude therefrom. Due to the insertion of the guide projection 33 into the guide groove 30a, the vertical pivotal movement of the link arm 30 in conjunction with the vertical movement of the cutting unit 10 is restricted to a predetermined movement. As the cutting unit 10 pivots downward from the upper rest position (see FIG. 1), the engaging roller 32 of the link arm 30 pushes the engaging plate portion 20a and moves in a counterclockwise direction about the support shaft 21, so that the movable cover 20 moves to be opened against the biasing force of the spring. FIG. 2 shows an open position of the movable cover 20. On the other hand, as the cutting unit 10 moves upward from the state where the movable cover 20 is positioned as shown in FIG. 2, the engaging roller 32 of the link arm 30 moves in a clockwise direction about the support shaft 21, so that the movable cover 20 is gradually closed due to its gravity and the biasing force of the spring.

When the rotary blade 14 cuts into the workpiece W with the movable cover 20 positioned at the open position, cutting chips (dust) produced at a cutting region C is blown upward by the flow of air produced by the rotating rotary blade 14. The cutting chips blown upward from the cutting region C enters between the left and right side portions 15L and 15R of the blade case 15 at a position about the rear portion of the blade case 15, so that many of the cutting chips are guided into the dust discharge member 18. However, if a clearance between the lower portion of the blade case 15 and the cutting region C is large, a part of the cutting chips blown upward from the cutting region C may not enter the blade case 15. In such a case, the efficiency for collecting the dust into the dust discharge member 18 may be degraded. In this example, in order to make up for this degradation, a dust guide device is provided. The dust guide device includes a dust guide member 40 disposed at the rear portion of the blade case 15.

The dust guide member 40 includes left and right dust guide wall portions 41 and 42, a dust guide bottom portion 43 connecting the dust guide wall portions 41 and 42 to each other at their rear parts, and a support arm portion 44 extending rearwardly from the dust guide bottom portion 43. The left and right dust guide wall portions 41 and 42 are positioned to extend toward the cutting edge of the rotary blade 14 on its left and right sides. The dust guide bottom portion 43 is positioned to extend rearwardly of the cutting edge. With this arrangement, the dust guide member 40 can inhibit cutting chips produced at the cutting region C from scattering to the surroundings.

The support arm portion 44 extends rearwardly from the rear portion of the left dust guide wall portion 41 and is positioned within substantially the same plane as the left dust guide wall portion 41. In this example, the rear end portion of the support arm portion 44 is coupled to the unit support bracket 11 via the support shaft 31 that pivotally supports the link arm 30. Thus, the dust guide member 40 is vertically pivotally supported by the unit support bracket 11 via the support shaft 31.

At the front portion of the left dust guide wall portion 41, a relief recess 41a is formed in a manner to have a stepped configuration. The relief recess 41a is opened toward the side of the left side portion 15L of the blade case 15. An arcuate guide wall portion 45 is formed on the front portion of the left dust guide wall portion 41 and extends along the upper portion of the relief recess 41a so as to protrude toward the left side portion 15L of the blade case 15. The guide wall portion 45 is rest on the guide projection 33 from the upper side.

Figure 4:
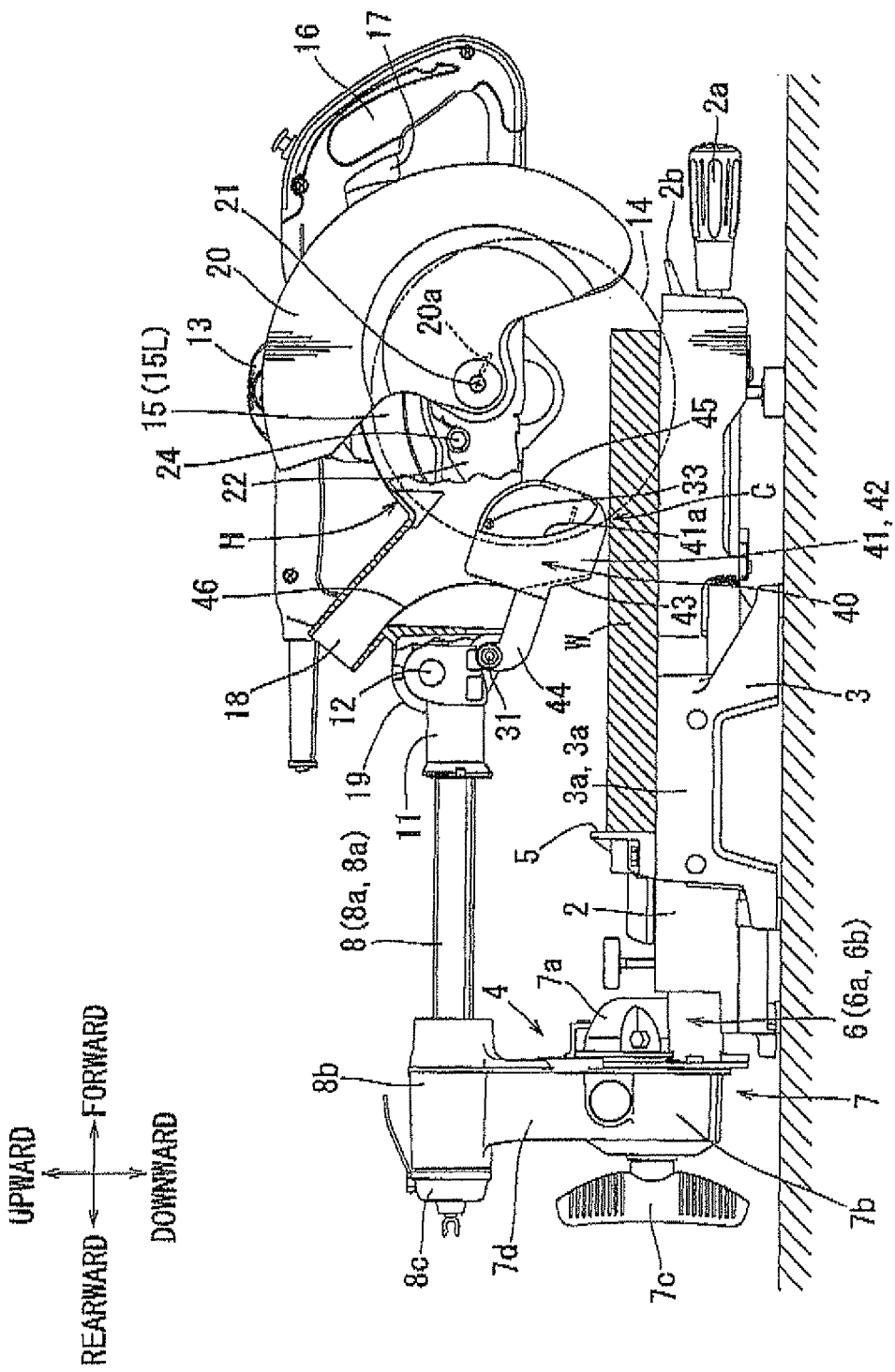
FIG. 4 is a left side view of the entire cutting device shown in FIG. 1 and showing the cutting unit in the state of being positioned at a lowermost position and at the front end slide position on the front most slide, while the rear portion of the blade case being shown in a vertical sectional view.

As shown in FIGS. 4 and 5, a leaf spring 46 is mounted to the dust guide bottom portion 43 of the dust guide member 40. More specifically, the leaf spring 46 is mounted to the dust guide bottom portion 43 such that the leaf spring 46 extends diagonally upward and rearward from the upper portion of the dust guide bottom portion 43. In this example, the leaf spring 46 has a configuration like a rectangular thin plate, with its upper portion entering into the dust discharge member 18 and resiliently pressed against the bottom of the dust discharge member 18. Therefore, the dust guide member 40 is biased in a direction of pivoting downward by the leaf spring 46. For this reason, as the guide projection 33 moves downward according to the downwardly pivoting movement of the cutting unit 10, the dust guide member 40 pivots downward about the support shaft 31 due to its gravity and the biasing force of the leaf spring 46.

The dust guide member 40 can pivot upward against the biasing force of the leaf spring 46. Therefore, even in the case that the lower portion of the dust guide member 40 contacts the upper surface of the workpiece W during the downward movement of the cutting unit 10, it is possible to still continue the downward movement of the cutting unit 10 after that.

The dust guide member 40 pivots about the support shaft 31 that is different from the support shaft 12 about which the cutting unit 10 pivots. The support shaft 31 is positioned to be spaced downwardly from the support shaft 12 by a predetermined axis-to-axis distance. Therefore, as the cutting unit 10 pivots downward, the dust guide member 40 biased downwardly by the leaf spring 46 pivots downward while the guide projection 33 moves relative to and along the lower surface of the guide wall portion 45. Therefore, the dust guide member 40 pivots downward relative to the blade case 15, so that the left and right dust guide wall portions 41 and 42 extend downward from the lower portion of the blade case 15 so as to be positioned closer to the cutting edge of the rotary blade 14. In comparing between the state shown in FIG. 3 where the cutting unit 10 is positioned at the uppermost position (where the dust guide member 40 is positioned at a storage position) and the state shown in FIG. 4 where the cutting unit 10 is positioned at the lowermost position (where the dust guide member 40 is positioned at an extended position), the left and right dust guide wall portions 41 and 42 in the state shown in FIG. 4 overlap with the rotary blade 14 by an area that is broader than that in the state shown in FIG. 3. From this fact, it may be clearly understood that the dust guide member 40 is brought to be closer to the cutting edge of the rotary blade 14 as it moves from the storage position toward the extended position.

Therefore, in the state where the cutting unit 10 has pivoted downward to cut the workpiece W by the rotary blade 14, the dust guide member 40 is positioned closer to the cutting region C. Hence, the cutting chips produced at the cutting region C can be efficiently blown into the space between the left and right dust guide wall portions 41 and 42 of the dust guide member 40.

As described above, the leaf spring 46 has a function of guiding the cutting chips drawn into the space between the left and right dust guide wall portions 41 and 42 toward the side of the dust discharge member 18 in addition to a function of biasing the dust guide member 40 downward. Therefore, once the cutting chips enter the space between the dust guide wall portions 41 and 42 after being blown upward from the cutting region C, they are reliably sequentially transferred into the dust discharge member 18 by the leaf spring 46.

As the cutting unit 10 moves upward from the lowermost position shown in FIGS. 2 and 4, the link arm 30 pivots in such a direction that the engaging roller 32 positioned at its front end moves rearward about the support shaft 21. Accordingly, the movable cover 20 is gradually closed and the dust guide member 40 gradually moves upward against the biasing force of the leaf spring 46 as the guide projection 33 moves upward. Because the pivotal axis (support shaft 12) of the cutting unit 10 and the pivotal axis (support shaft 31) of the dust guide member 40 are positioned at different positions, the dust guide member 40 moves such that the guide projection 33 moves rearward along the guide wall portion 45. As a result, the dust guide member 40 moves upward relative to the blade case 15 and moves in a direction away from the cutting edge of the rotary blade 14.

According to the cutting device 1 having the dust guide device described above, as the cutting unit 10 moves downward, the dust guide member 40 pivots to extend downward from the blade case 15 and to move closer to the cutting edge of the rotary blade 14. Therefore, during the cutting operation, the left and right dust guide wall portions 41 and 42 can shield the cutting region C at a position closer to the cutting region C and the dust guide bottom portion 43 can shield the cutting region C from the rear side. Therefore, it is possible to position the dust guide member 40 to be able to reliably collect the cutting chips. As a result, the efficiency for collecting the cutting chips toward the dust discharge member 18 can be further improved.

The dust guide member 40 moves downward while being allowed to retract upward. Therefore, for example, in the state that the dust guide member 40 contacts a thick workpiece, the cutting unit 10 can move downward to cut the workpiece by the rotary blade 14. Hence, it is possible to further reliably cover around the cutting region C, and the efficiency of collecting the cutting chips toward the dust discharge member 18 can be improved also in this respect.

Further, because the dust guide member 40 is moved by utilizing the guide projection 33 that is a part of a mechanism for opening and closing the movable cover 20 in response to the vertical movement of the cutting unit 10, it is possible to improve the dust collecting efficiency while enabling to simplify the construction.

The operation timing and the moving path of the dust guide member 40 can be suitably set by selecting the shape (cam shape) of the guide wall portion 45 engaging the guide projection 33 from the upper side. Therefore, it is possible to suitably control the position of the dust guide member 40 relative to the cutting region C.

Further, because the leaf spring 46 having a function of biasing the dust guide member 40 downward also has a function of guiding the cutting chips to the dust discharge member 18, it is possible to achieve a higher dust collecting efficiency with a compact construction.

The first example described above can be modified in various ways. For example, the leaf spring 46 biasing the dust guide member 40 downward can be replaced with a torsion coil spring fitted around the support shaft 31. It is also possible to omit the biasing device (leaf spring 46) for biasing the dust guide member 40 downward. In this case, the dust guide device may pivot downward by its gravity, and therefore, the same operation and advantages as described above can be achieved.

Further, in the above example, the guide projection 33 moving relative to the link arm 30 is utilized for guiding the dust guide member 40 while the dust guide member 40 being allowed to retract upward. However, a separate member from the guide projection 33 can be used for engaging the guide wall portion 45 in order to move the dust guide member 40 in the same manner as described above. For example, a guide wall portion may be provided on the right dust guide wall portion 42, and a guide projection may be provided on the right side portion 15R of the blade case 15 for engaging the guide wall portion.

Furthermore, although the support shaft 31 pivotally supporting the link arm 30 is used for pivotally supporting the dust guide member 40, a separate support shaft from the support shaft 31 can be provided for pivotally supporting the dust guide member 40.

Figure 9:
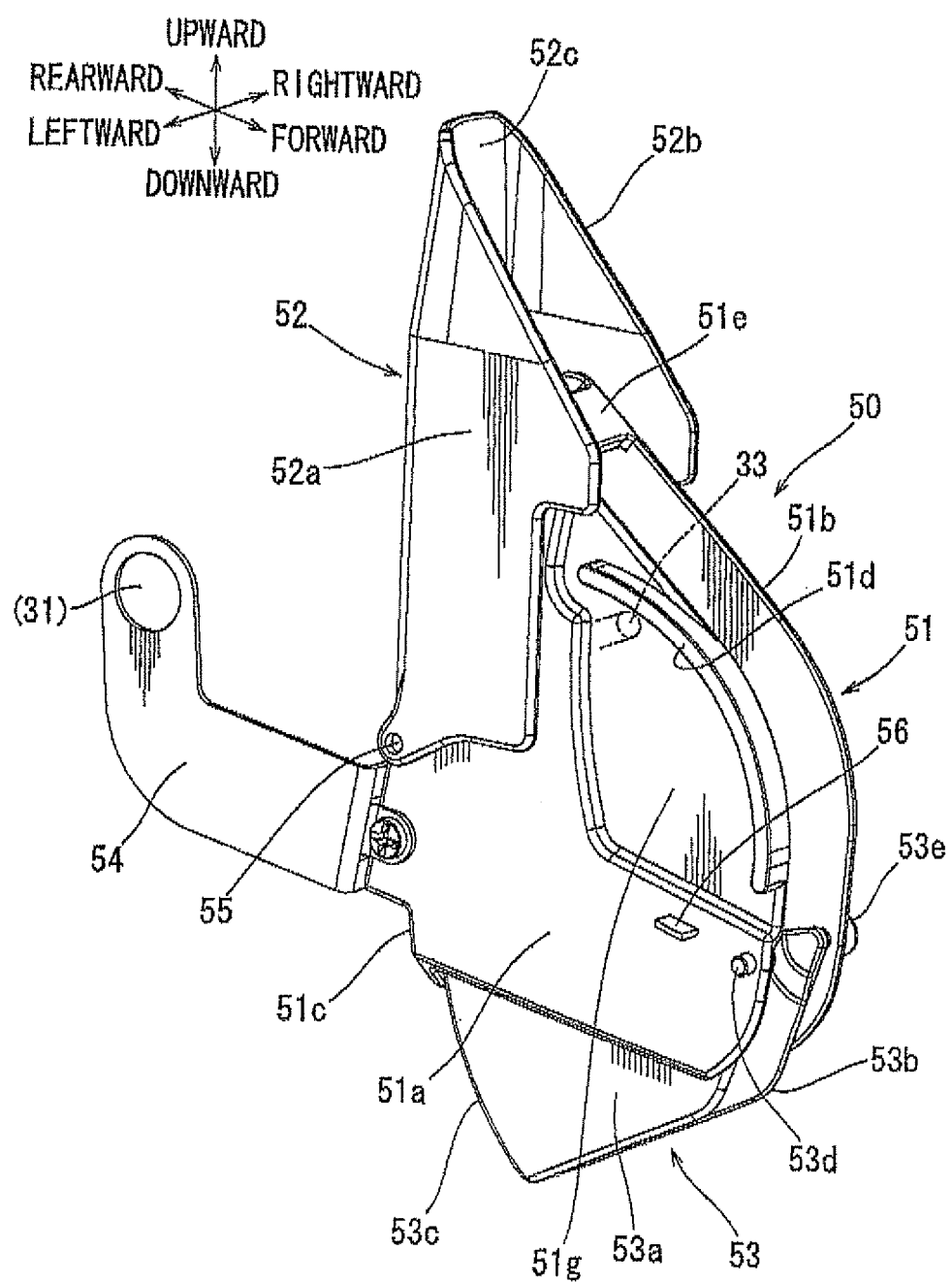
FIG. 9 is a perspective view of the dust collecting guide device of the second example and showing the state where the left side surface is viewed diagonally from the front side.
Figure 10:
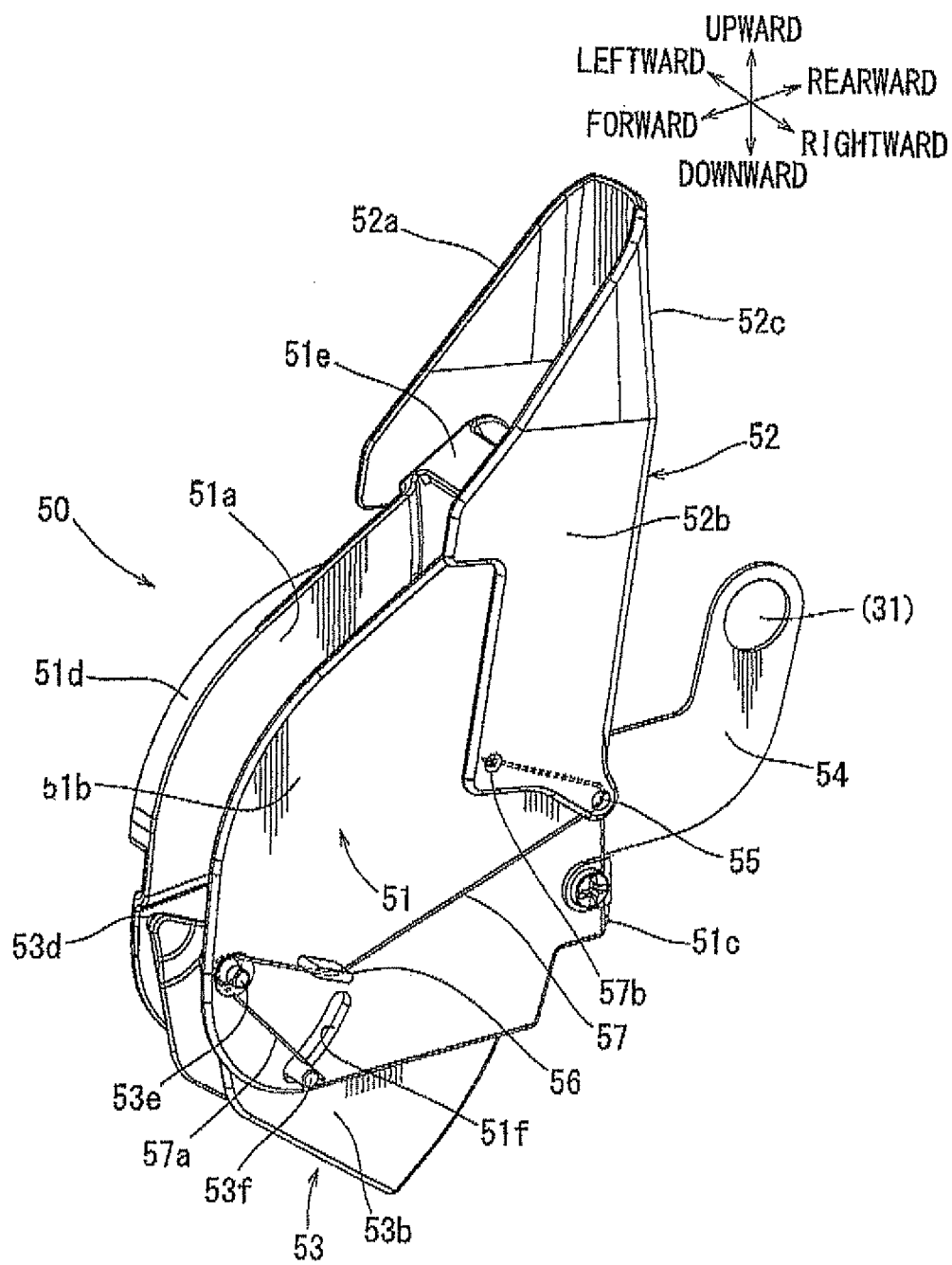
FIG. 10 is a perspective view solely of the dust collecting guide device of the second example and showing the state where the right side surface is viewed diagonally from the front side.

A second example will now be described with reference to FIGS. 6 to 8. A cutting device according to the second example is the same as the cutting device 1 of the first example except for the construction of the dust guide device. Therefore, in FIGS. 6 to 8, like members are given the same reference signs as the first example and the description of these members will not be repeated. FIGS. 9 and 10 shows solely the dust guide device according to the second example.

The dust guide device of the second example includes a dust guide member 50. The dust guide member 50 is different from the dust guide member 40 in that upper and lower auxiliary dust guide members 52 and 53 are provided in addition to a guide body 51 that corresponds to the dust guide member 40 of the first example. Similar to the case of the dust guide member 40 of the first example, a support arm portion 54 extends rearward from the rear portion of the guide body 51. The rear portion of the support arm portion 54 is coupled to the unit support bracket 11 via the support shaft 31 in the same manner as the first example. Therefore, the guide body 51 is vertically pivotally supported by the support arm portion 54 via the support shaft 31.

The guide body 51 is a resin mold product. Similar to the dust guide member 40 of the first example, the guide body 51 has a U-shaped configuration and includes left and right dust guide wall portions 51a and 51b and a dust guide bottom portion 51c. The support arm portion 54 is mounted to the rear surface of the dust guide bottom portion 51c and extends rearwardly therefrom. Similar to the first example, a relief recess 51g is formed in the left dust guide wall portion 51a. An arcuate guide wall portion. 51d that is upwardly convex is formed on the left dust guide wall portion 51a and extends along the upper portion of the relief recess 51g. Similar to the first example, the guide wall portion 45 is rest on the guide projection 33 from the upper side, so that the guide body 51 can pivot vertically in response to the vertical movement of the cutting unit 10, while the guide body 51 being permitted to retract upward.

The left and right dust collecting guide wall portions 51a and 51b are connected to each other by a connecting wall portion 51e, so that the left and right dust collecting guide wall portions 51a and 51b are spaced from each other by a fixed distance.

As shown in FIGS. 9 and 10, stopper edge portions 56 are provided on the left and right dust collecting guide wall portions 51a and 51b, respectively, so as to extend laterally therefrom. The stopper edge portions 56 can contact the lower end of the unit case H for restricting the uppermost position (retracted position) of the guide body 51 relative to the unit case H.

An upper guide support shaft 55 is supported by the guide body 51 to extend along the dust guide bottom portion 51c. The upper auxiliary guide member 52 is supported by the upper guide support shaft 55 and can pivot forwardly and rearwardly about the upper guide support shaft 55. Also, the upper auxiliary guide member 52 is a resin molded product and has a U-shaped configuration. The upper auxiliary guide member 52 includes left and right dust guide wall portions 52a and 52b and a dust guide bottom portion 52c. The left and right dust guide wall portions 51a and 51b of the guide body 51 are inserted between the left and right dust guide wall portions 52a and 52b. The upper auxiliary guide member 52 is biased by a spring 57 in a rearwardly pivoting direction. Therefore, when the cutting unit 10 is positioned at any of the pivoted positions shown in FIGS. 6 to 8, the upper portion of the upper auxiliary guide member 52 always enter into inside of the dust discharge member 18 and is held to be resiliently pressed against the bottom of the dust discharge member 18. Hence, similar to the leaf spring 46, the upper auxiliary guide member 52 has a function of guiding the cutting chips into the dust discharge member 18.

The lower auxiliary guide member 53 is supported by the front portion of the guide body 51. Also, the lower auxiliary guide member 53 is a resin molded product and has a U-shaped configuration. The lower auxiliary guide member 53 includes left and right dust guide wall portions 53a and 53b and a dust guide bottom portion 53c. Lower guide support shafts 53d and 53e are formed integrally with the front portions of the left and right dust guide wall portions 53a and 53b, respectively, and protrude laterally therefrom. The lower guide support shafts 53d and 53e have the same axis. The lower auxiliary guide member 53 is vertically pivotally supported by the front portion of the guide body 51 via the left and right guide support shafts 53d and 53e. As shown in FIG. 6, the lower auxiliary guide member 53 can be positioned within the guide body 51 when it pivots upward. On the other hand, as shown in FIG. 8, the lower auxiliary guide member 53 extends downward from the lower portion of the guide body 51 as it pivots downward. As shown in FIG. 10, a restricting shaft portion 53f is formed integrally with the right dust guide wall portion 53b and extends laterally therefrom. The restricting shaft portion 53f extends into a restricting groove portion 51f provided on the right dust guide wall portion 51b of the guide body 51. The restricting groove portion 51f is configured to have an arc shape about the lower guide support shaft 53e of the lower auxiliary guide member 53. The lower auxiliary guide member 53 is vertically movable relative to the guide body 51 within an angular range allowed for the restricting shaft portion 53f to move within the restricting groove portion 51f.

Also, the lower auxiliary guide member 53 is biased by the spring 57 in a downwardly extending direction. As shown in FIG. 10, the spring 57 is formed by bending a spring wire. The spring 57 has an end portion 57a resiliently pressed against the restricting shaft portion 53f from the upper side and an opposite end portion 57b hooked on the right dust guide wall portion 52b of the upper auxiliary guide member 52. The spring 57 has portions that are positioned between the end portions 57a and 57b and engage the lower guide support shaft 53e, which pivotally supports the lower auxiliary guide member 53, from above and engage the upper guide support shaft 55, which pivotally supports the upper auxiliary guide member 52, from below, respectively. In addition, a portion of the spring 57 positioned between the lower guide support shaft 53 and the upper guide support shaft 55 engages the stopper edge portion 56 of the right dust guide wall portion 51b of the guide body 51 from below. Therefore, by using the spring 57 that is a single component engaging the various portions described above, the upper auxiliary guide member 52 is biased in a direction of pivoting rearward and the lower auxiliary guide member 53 is biased in a direction of extending downward.

As described above, the lower auxiliary guide member 53 can extend downward from the lower portion of the guide body 51. Therefore, even in the case that a clearance is produced between the guide member 51 and the workpiece W as in the case of cutting a thin workpiece, such as a wooden floor material, shown in FIG. 8, such a clearance can be closed by the lower auxiliary guide member 53 because the lower auxiliary guide member 53 extends downwardly from the lower portion of the guide body 51 and contacts the upper surface of the workpiece W. Therefore, the cutting chips produced at the cutting region C can be reliably prevented from scattering and it is possible to more reliably collect the dust.

The cutting chips collected by the lower auxiliary guide member 53 may be blown into the guide body 51 and further into the upper auxiliary guide member 52. The upper auxiliary guide member 52 is biased in the rearwardly pivoting direction by the spring 57, so that the upper portion of the upper auxiliary guide member 52 always enters the dust discharge member 18 and is pressed against the bottom of the dust discharge member 18. Therefore, the cutting chips blown upwardly into the guide body 51 can be reliably transferred to the dust discharge member 18 via the upper auxiliary guide member 52.

As described above, according to the dust guide device having the dust guide member 50 of the second example, regardless of the pivoted position of the cutting unit 10, a dust transfer path from the cutting region C to the dust discharge member 18 can be formed by the guide body 51 and the upper and lower auxiliary guide members 52 and 53 substantially without interruption. Therefore, in particular in the case of cutting the workpiece having a thin thickness, cutting chips produced at the cutting region C can be reliably efficiently collected and guided to the dust discharge member 18. Therefore, the dust collecting efficiency of the cutting device 1 can be further improved.

Figure 6:
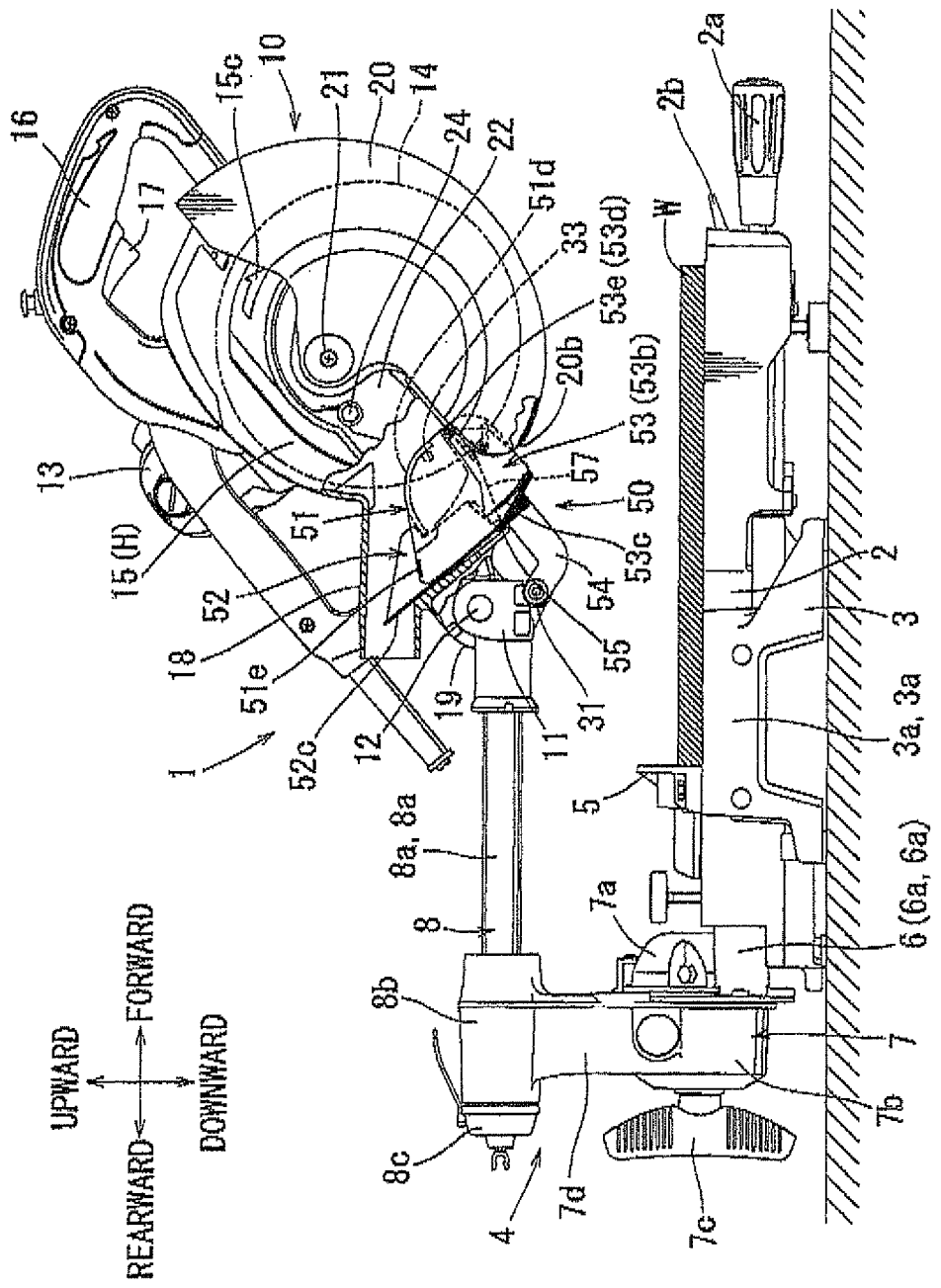
FIG. 6 is a left side view of an entire cutting device having a dust collecting guide device according to a second example and showing a cutting unit in the state of being positioned at an uppermost position and at a front end slide position on the front most slide.
Figure 7:
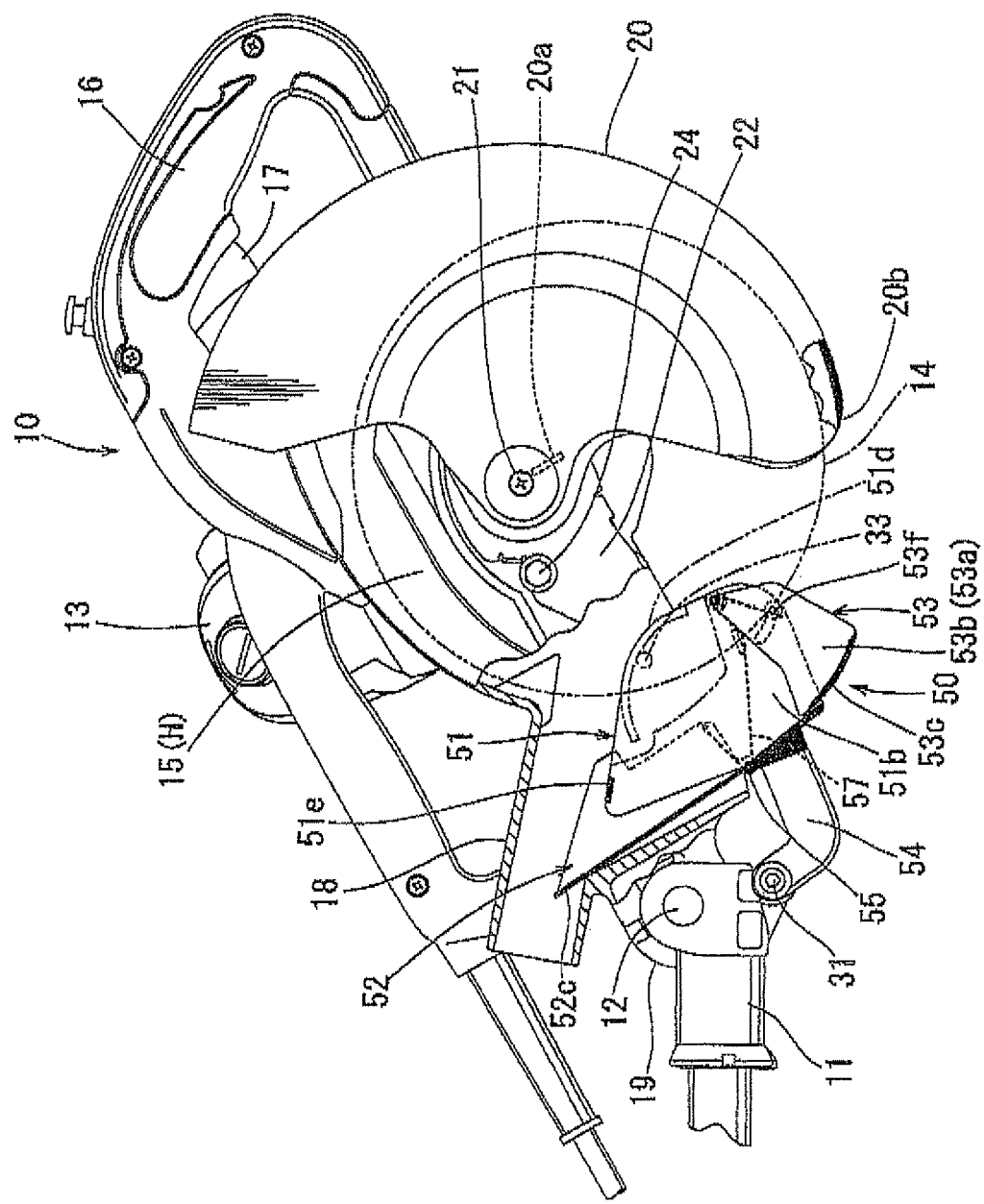
FIG. 7 is a left side view of the cutting unit having the dust collecting guide device of the second example and showing the cutting unit in the state of being moved downward slightly from the uppermost position to the result that a movable cover is slightly opened.
Figure 8:
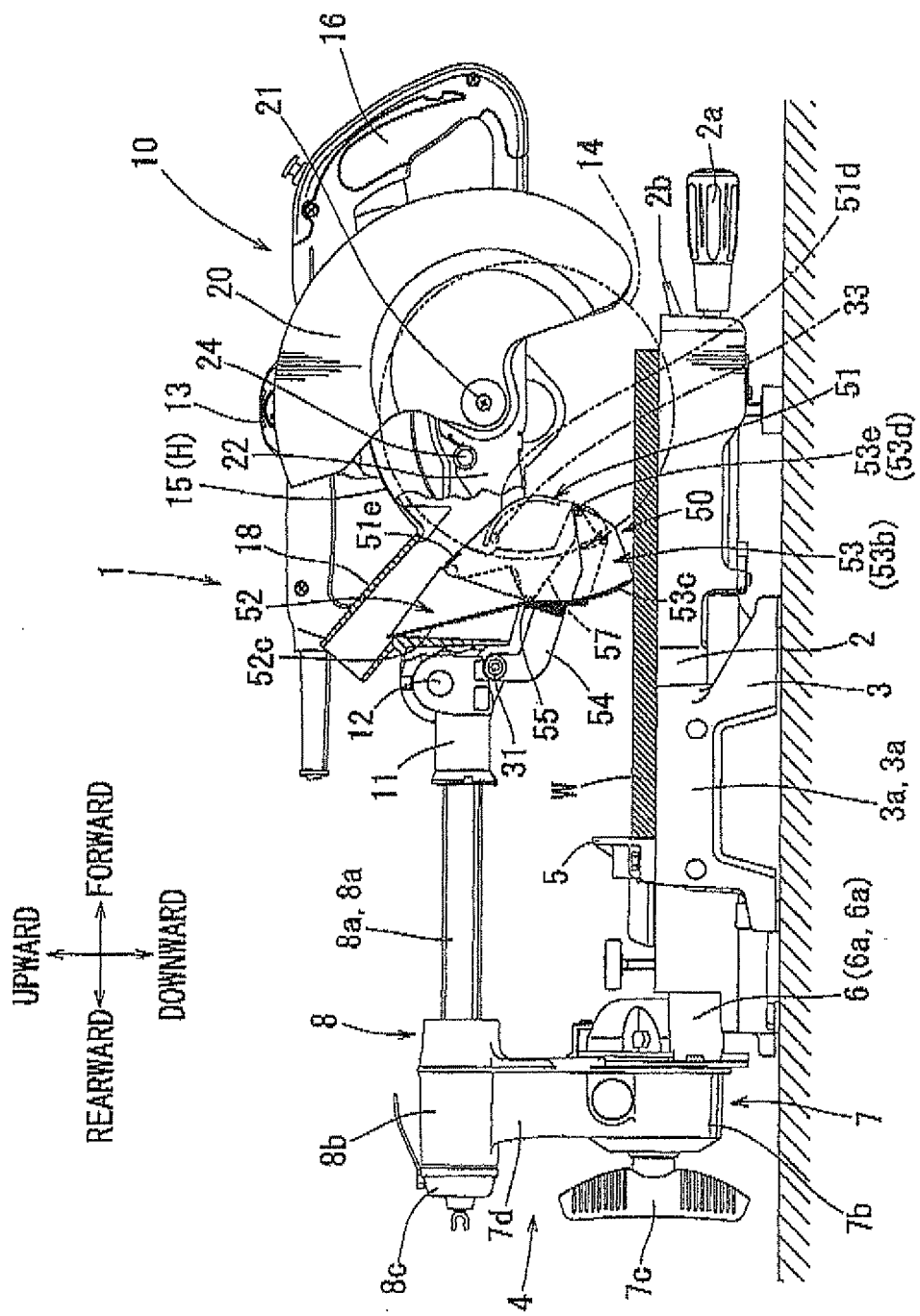
FIG. 8 is a left side view of the cutting unit having the dust collecting guide device of the second example and showing the cutting unit in the state of being moved downward to the lowermost position and to the front end slide position on the front most side.

As the cutting unit 10 returns upward, the dust guide member 50 moved from the position shown in FIG. 8 to the storage position shown in FIG. 6. Thus, as described in connection with the first example, as the cutting unit 10 returns upward, the guide body 51 returns upward by being lifted due to the upward movement of the guide projection 33. In conjunction with this, the link arm 30 changes its position to move the movably cover 20 to the close position. As the movable cover 20 moves to be closed, an end portion 20b on the closing side of the movable cover 20 pushes the lower auxiliary guide member 53 from the lower side. Therefore, the lower auxiliary guide member 53 pivots upward relative to the guide body 51 against the biasing force of the spring 57, so that the lower auxiliary guide member 53 moves into the storage position within the guide body 51. In the storage position, the left and right dust guide wall portions 52a and 52b are positioned to extend along the outer sides of the left and right dust guide wall portions 51a and 51b of the guide body 51, respectively.

Figure 11:
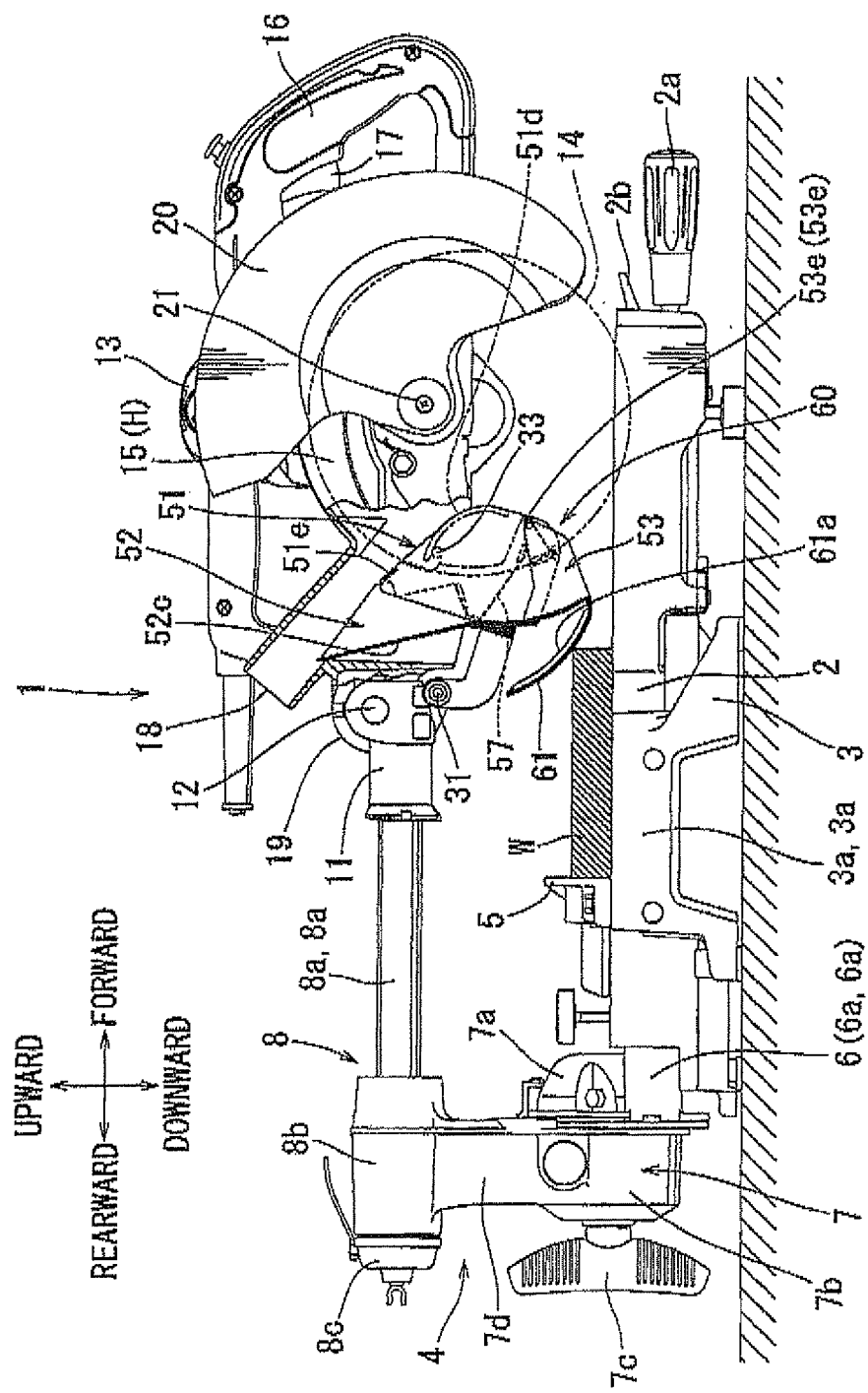
FIG. 11 is a left side view of an entire cutting device having a dust collecting guide device according to a third example and showing a cutting unit in the state of being positioned at a lowermost position and at a front end slide position on the front most slide.
Figure 12:
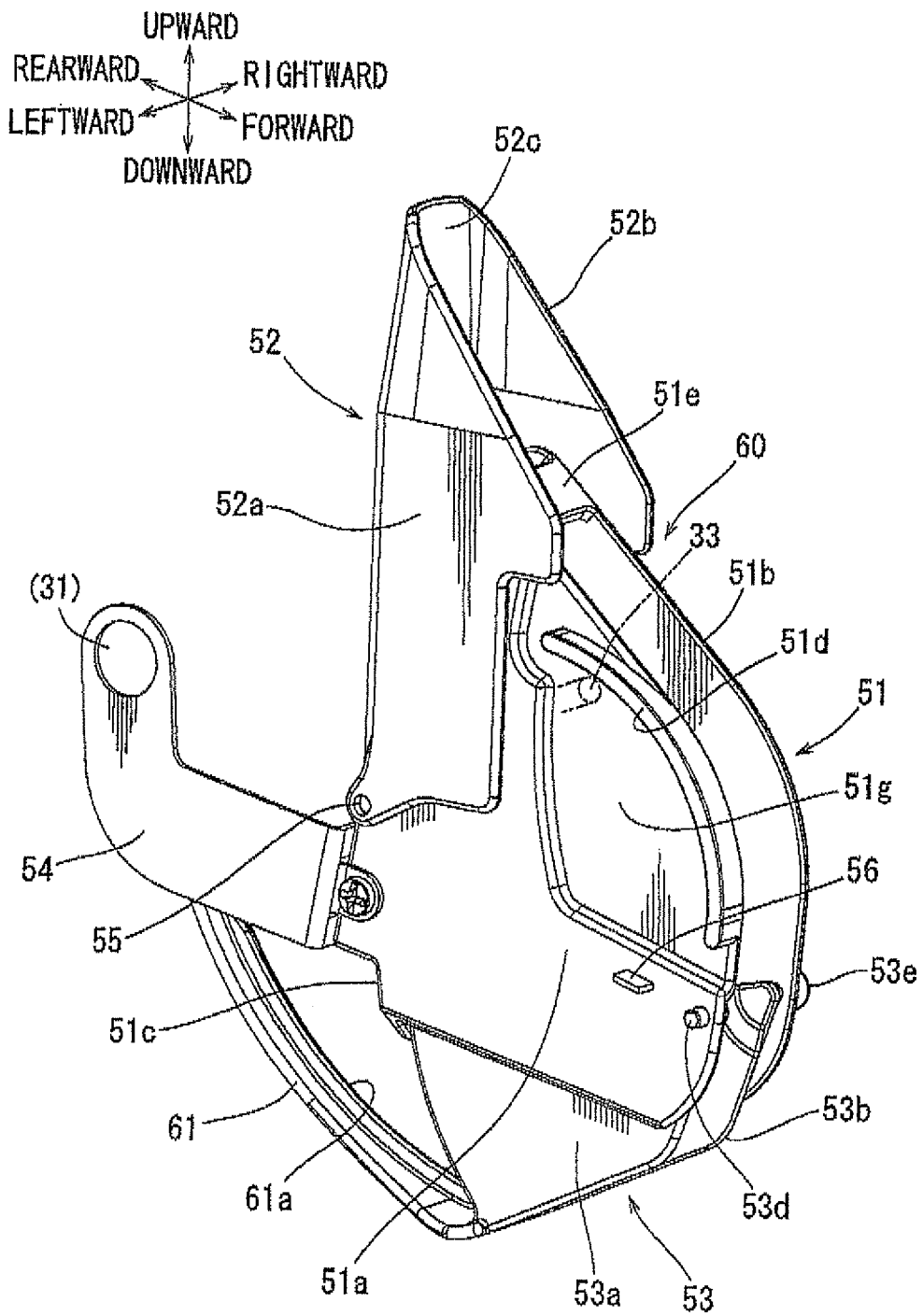
FIG. 12 is a perspective view solely of the dust collecting guide device of the third example and showing the state where the left side surface is viewed diagonally from the front side.

A third example will now be described with reference to FIGS. 11 and 12. Referring to FIG. 11, there is shown a cutting device 1 having a dust guide device according to the third example. The dust guide device is shown solely in FIG. 12. The dust guide device of this example includes a dust guide member 60 that is different from the dust guide member 50 of the second example in the provision of an escape guide portion 61 at the lower auxiliary guide member 53. In other respect, the dust guide member 60 is substantially the same as the dust guide member 50. Therefore, in FIGS. 11 and 12, like members are given the same reference signs as the second example and the description of these members will not be repeated.

The escape guide portion 61 extends rearwardly from the lower end portion of the dust guide bottom portion 53c at the rear end portion of the lower auxiliary guide member 53. The escape guide portion 61 is molded integrally with the lower auxiliary guide member 53 that is a resin molded product. The escape guide portion 61 has an arc shape and is gently curved with a downwardly convex orientation. A rib 61a is formed integrally with the upper surface of the escape guide portion 61 and extends throughout its length for the purpose of maintaining the shape of the escape guide portion 61.

The escape guide portion 61 serves to enable the lower auxiliary guide member 53 to smoothly pivot upward to be moved onto the upper surface of the workpiece W without causing interference between the lower auxiliary guide member 53 and the front end of the workpiece W when the cutting unit 10 is slid rearwardly in parallel to the upper surface of the workpiece W after the cutting unit 10 has pivoted downwardly. Thus, the cutting unit 10 is lowered to its lowermost position (lower dead center) and is positioned at the front slide end position as shown in FIG. 11. Then, the operator moves the cutting unit 10 rearward (i.e., a direction of proceeding the cutting operation). During this movement of the cutting unit 10, the escape guide portion 61 first contacts the front end of the workpiece W Because the escape guide member 61 slidably contacts the workpiece W as the cutting unit 10 is slid rearward, the lower auxiliary guide member 53 pivots gradually upward about the support shafts 53d and 53e, and eventually the lower auxiliary guide member 53 is brought to move onto the upper surface of the workpiece W. Therefore, in the state that the lower auxiliary guide member 53 contacts the upper surface of the workpiece W, the cutting operation proceeds as the cutting unit 10 is slid rearward. Hence, the cutting chips produced at the cutting region C is effectively collected into the dust discharge member 18 via the guide body 51 and the upper auxiliary guide member 52.

In this way, according to the dust guide device having the dust guide member 60 of the third example, in the case that the cutting unit 10 is moved downward and is then slid rearward for performing the cutting operation, it may be possible that the lower auxiliary guide member 53 is not positioned on the upper surface of the workpiece W at the beginning of the cutting operation. However, as the cutting unit 10 is slid, the lower auxiliary guide member 53 automatically smoothly moves onto the upper surface of the workpiece W from its front side by the sliding action of the escape guide portion 61 without need of manual operation by the operator. Therefore, it is possible to improve the operability of the dust guide device and eventually the operability of the cutting device 1.

A fourth example will now be described with reference to FIGS. 13 to 29. A cutting device 110 shown in FIGS. 13 to 18 also is configured as a slide-type cutting device and is constructed to be able to collect cutting chips or dust. The cutting device 110 generally includes a base 111, a table 120, a slide mechanism 130 and a cutting unit 140. Also in the following description of this example, a front side, a rear side, a left sided and a right side are used to mean the sides as viewed from the side of the operator who operates the cutting device 110. Thus, the side of an operation handle portion 571 is the front side of the cutting unit 140, and the side opposite to this side is the rear side of the cutting unit 140. The cutting unit 140 is slid to be moved from the front side toward the rear side.

The base 111 is constituted as a suitable member and has a plurality of legs 112 extending in suitable directions. Reference numeral 113 denotes auxiliary legs serving as extension Members of the legs 112. The base 111 serves to support the table 120, the slide mechanism 130 and the cutting unit 140 as will be explained later. The legs 112 may be placed on a horizontal surface, such as a surface of a workbench. Although not described in the first example, the base 3 of the first example also has legs similar to the legs 112.

Figure 3:
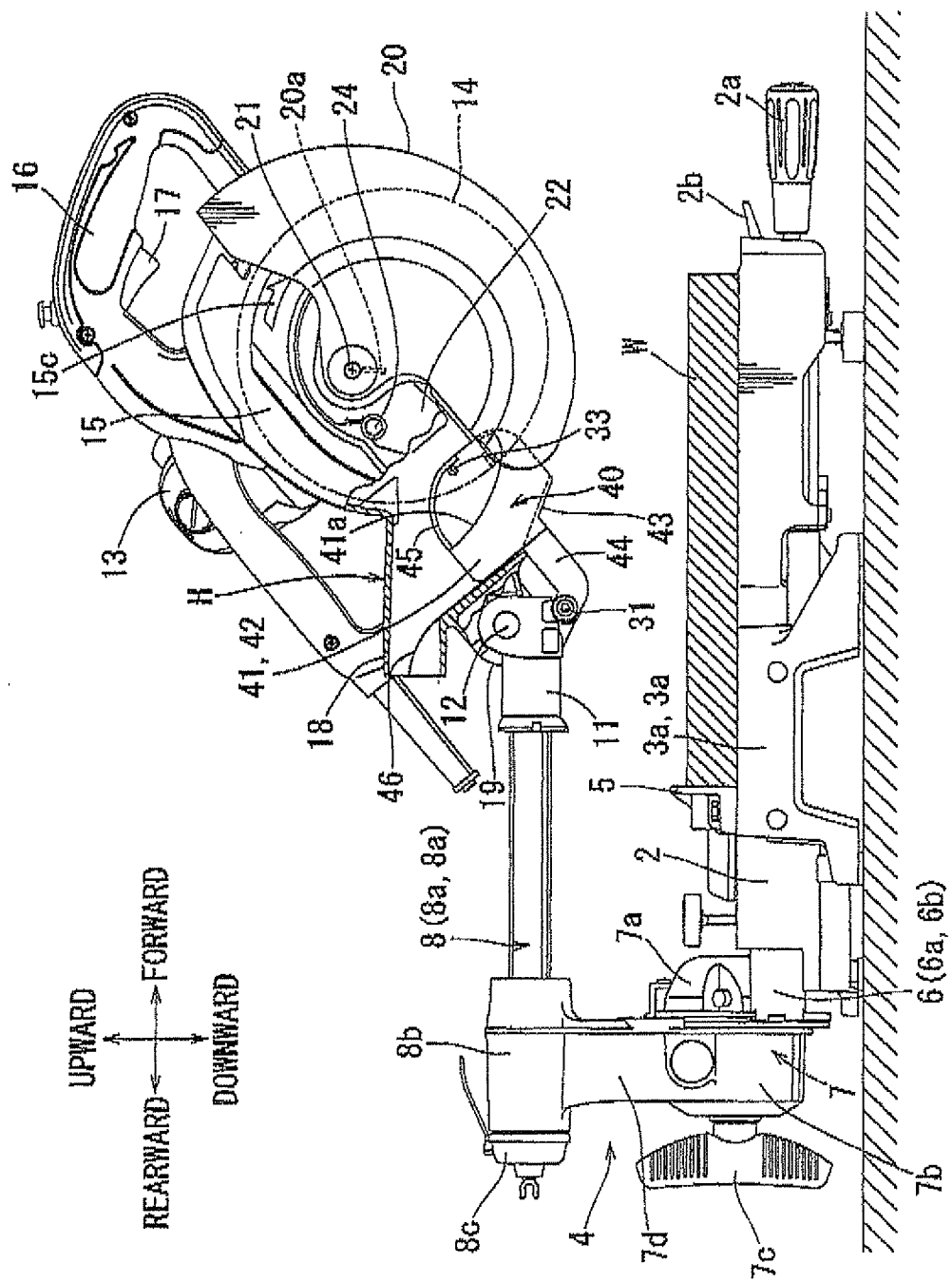
FIG. 3 is a left side view of the entire cutting device shown in FIG. 1 and showing the cutting unit in the state of being positioned at the uppermost position and at the front end slide position on the front most slide, while a rear portion of a blade case being shown in a vertical sectional view.
Figure 14:
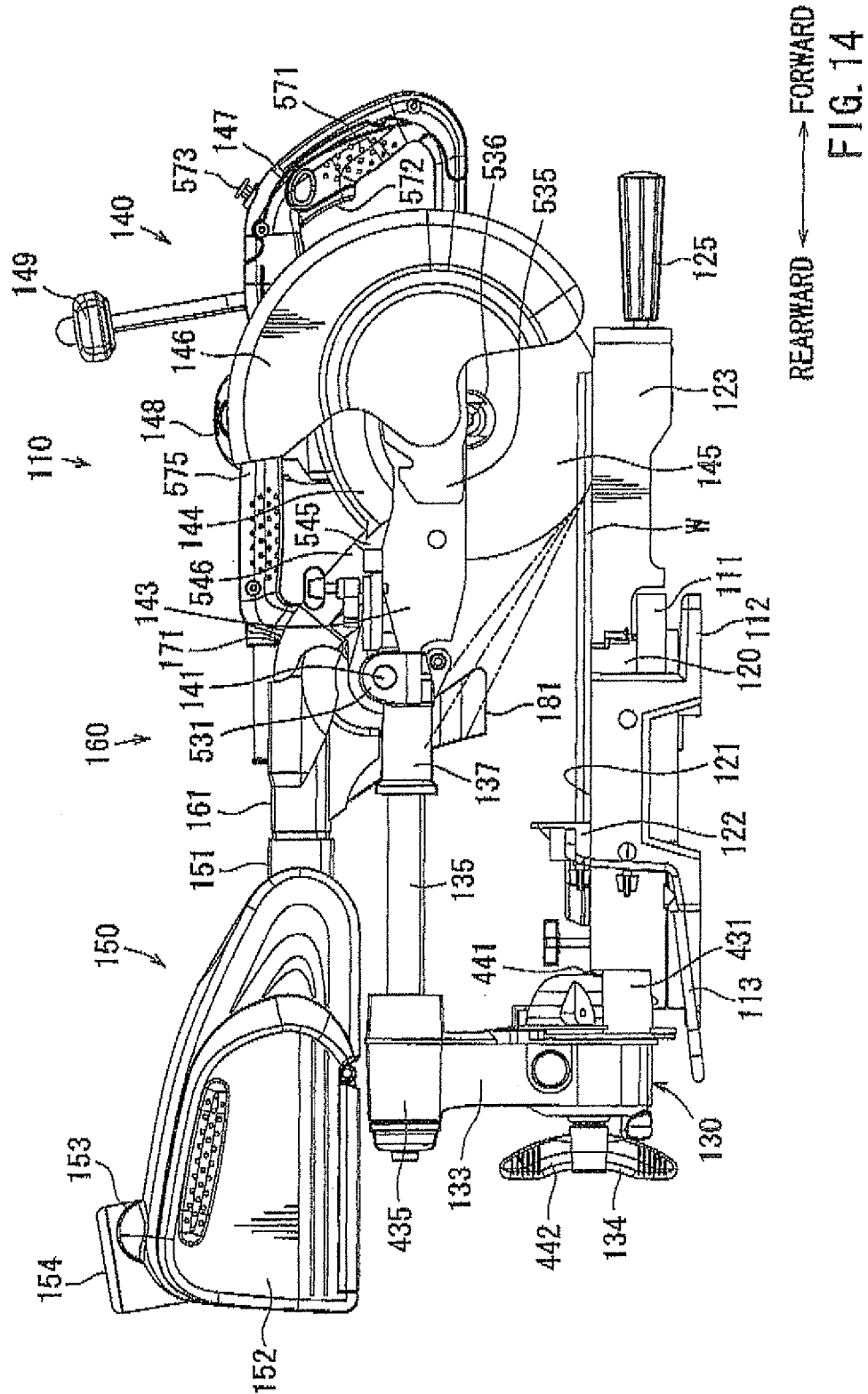
FIG. 14 is a side view of the cutting device shown in FIG. 13.
Figure 15:
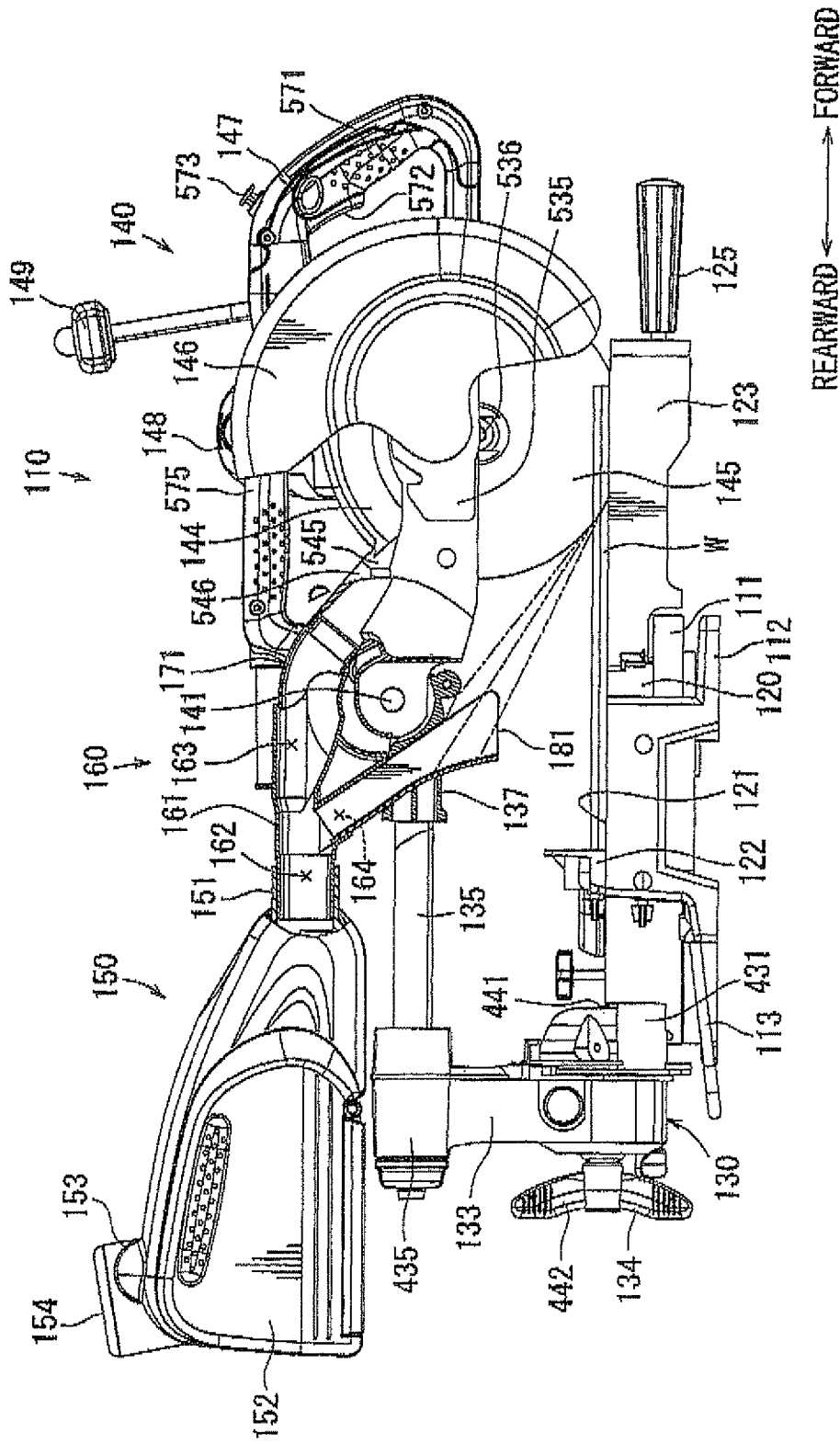
FIG. 15 is a right side view, with a part shown in a cross section, of the cutting device shown in FIG. 13.

An upper surface of the table 120 serves as a placement surface 121 for placing the workpiece W (see FIGS. 2 and 3). The table 120 has a substantially disc-like configuration as a whole and is supported by the base 111 so as to be rotatable relative thereto. As described above, because the legs 112 are placed on the horizontal surface, the placement surface 121 of the table 120 for placing the workpiece W is a horizontally extending surface as shown in FIGS. 14 and 15. The reference numeral 122 denotes a positioning fence for setting the position of the workpiece W placed on the placement surface 121. The positioning fence 122 is mounted to the base 111. Therefore, the table 120 is rotatable relative to the base 111 and is also rotatable relative to the positioning fence 122. The reference numeral 123 (see FIG. 13) denotes a blade accommodating portion that is provided on the table 120 and extends in the diametrical direction of the table 120. The blade accommodating portion 123 is configured to allow a rotary blade 145 of the cutting unit 140 to move to a position beyond the workpiece W for cutting the workpiece W. To this end, the blade accommodating portion 123 is formed with a blade intrusion recess 124 allowing intrusion of a part of the rotary blade 145 of the cutting unit 10 that is moved to slide. Although not described in the first example, the table 2 of the first example also has a blade accommodating portion having a blade intrusion recess similar to that of the fourth example.

The reference numeral 125 denotes a lock knob operable to rotate the table 120 relative to the base 111 while keeping the placement surface 121 to extend horizontally. By operating the lock knob 125, it is possible to rotate the table 120 relative to the base 111 and to position the table 120 at a desired rotational position.

The slide mechanism 130 is a mechanism corresponding to the slide mechanisms 6 and 8 of the first example. Therefore, the slide mechanism 130 serves as a cutting unit support device that is supported by the base 111 and vertically pivotally supports the cutting unit 140 relative to the table 120. In addition, the slide mechanism 130 also enables the cutting unit 140 to slide relative to the table 120. As the cutting unit 140 is slid relative to the table 120 by the slide mechanism 130, it is possible to cut the workpiece W placed on the placement surface 121 of the table 120. As shown in FIG. 14, the slide mechanism 130 generally includes base-side slide bars (not shown), a support arm 133, unit-side slide bars 135 and a slider 137.

The base-side slide bars correspond to the slide bars 6a of the first example. Although not shown as being hidden behind the table 120, the base-side slide bars are two rod-like bars and are fixedly supported by the table 120 that is supported by the base 111. Therefore, the base-side bars rotate with the table 120 relative to the base 111 as the table 120 rotates relative to the base 111. The base-side slide bars extend parallel to the placement surface 121 of the table 120, and therefore, they extend in the horizontal direction that is the same as the extending direction of the placement surface 121 of the table 120.

Figure 13:
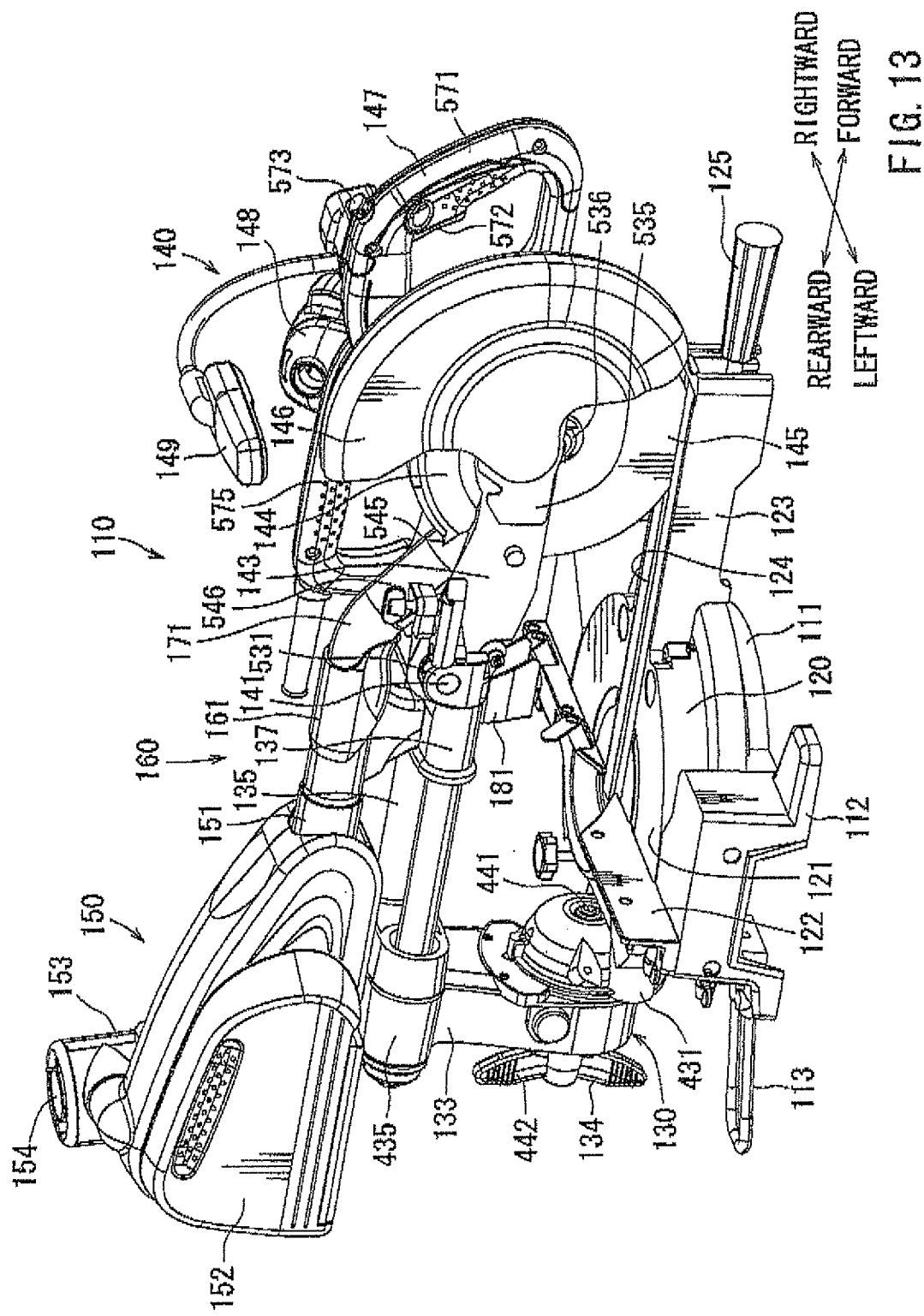
FIG. 13 is a perspective view of a cutting device according to a fourth example.

As shown in FIG. 13, the support arm 133 includes a pivot receiver member 431 and a slide support member 435 that slidably supports the unit-side slide bars 135 (corresponding to the slide bars 8a of the first example). The pivot receiver member 431 and the slide support member 435 are coupled so as to be rotatable relative to each other by a coupling lever mechanism 134. The coupling lever mechanism 134 includes a rotational shaft 341 inserted into both of the pivot receiver member 431 and the slide support member 435, and a fixing lever 442 operable to rotate the rotational shaft 341. The coupling lever mechanism 134 is configured to be able to switch between a condition for allowing the rotation of the pivot receiver member 431 and the slide support member 435 relative to each other and a condition for preventing the pivot receiver member 431 and the slide support member 435 from rotating relative to each other. This switching operation can be performed by rotating the fixing lever 442. When the pivot receiver member 431 and the slide support member 435 are allowed to rotate relative to each by rotating the fixing lever 142, it is possible to pivot the slide support member 435 relative to the pivot receiver member 431. Thus, it is possible to change the position the cutting unit 10 from a vertical position relative to the table 120 to a position inclined relative the table 120. Therefore, the cutting unit 140 can be used for performing an inclined cutting operation.

As shown in FIG. 13, the unit-side slide bars 135 are two rod-like bars and their rear portions are slidably inserted into the support arm 133. The unit-side slide bars 135 extend parallel to the base-side slide bars. Therefore, the unit-side slide bars 135 is slidably supported by the support arm 133 and extends parallel to the placement surface 121 of the table 120, and hence, the unit-side slide bars 135 extend horizontally as with the placement surface 121 of the table 120.

The slider 137 is fixedly attached to the front ends of the unit-side slide bars 135, and Therefor, is supported by the base 111. Hence, as the unit-side slide bars 135 slid, the slider 137 moves toward and away from the support arm 133. Thus, the slider 137 slides in a horizontal direction parallel to the placement surface 121 of the table 120 to make parallel displacement relative thereto at a position above the table 120. As will be explained later, the cutting unit 140 and a first transfer tubular member 161 of a dust guide device 160 is supported on the slider 137 not to move relative thereto in the horizontal direction. Therefore, as the slider 137 slides, the cutting unit 140 and the first transfer tubular member 161 move horizontally relative to the placement surface 121 of the table 120.

The cutting unit 140 having the rotary blade (rotary saw blade) 145 and supported on the slider 137 will now be described. As shown in FIG. 14, the cutting unit 140 can cut the workpiece W placed on the placement surface 121 of the table 120. The cutting unit 140 is vertically pivotally supported by the slider 137 via a unit support shaft 141. Therefore, the cutting unit 140 can slide horizontally in parallel to the placement surface 121 of the table 120 and can pivot vertically to cause movement of the rotary blade 145 toward and away from the placement surface 121 of the table 120. As shown in FIG. 13, the cutting unit 140 generally includes a support portion 143, the rotary blade 145, the handle portion 147, an electric motor 148 and a lighting device 149.

The support portion 143 serves as a base member of the cutting unit 140 and supports various parts of the cutting unit 140 as will be explained later. The support portion 143 is pivotally supported by the slider 137 via the unit support shaft 141 that is supported by the slider 137. More specifically, the rear portion of the support portion 143 is configured as a unit support bracket 531 that is supported by the slider 137. The unit support bracket 531 has an axial hole into which the unit support shaft 141 is inserted. Therefore, the cutting unit 140 including the support portion 143 can vertically pivot relative to the slider 137 about the unit support shaft 141 that serves as a pivot axis.

On the other hand, the front portion of the support portion 143 on the side opposite to the unit support bracket 531 is configured as a unit case 535 that supports the rotary blade 145. The unit case 535 rotatably supports the rotary blade 145 although it is not clearly shown how the rotary blade 145 is supported in the drawings because it is partly hidden behind a blade case 144. More specifically, the unit case 535 is formed integrally with the unit support bracket 531 so as to extend forwardly therefrom. The blade case 144 is formed integrally with the upper portion of the unit case 535. Although it is not clearly shown in the drawings for the reason as explained above, the unit case 535 has a blade support portion 536 for rotatably supporting the rotary blade 145. The blade case 144 is positioned to be opposed to the outer peripheral portion of the rotary blade 145 in such a manner that it surrounds the rotary blade 145. The blade case 144 is formed to have a size to cover the upper half of the rotary blade 145. Therefore, as the rotary blade 145 rotates within the blade case 144 in a clockwise direction as viewed in FIG. 14, a flow of air is produced because the rotating rotary blade 145 draws the air around the table 120. This mechanism of production of flow of air by the rotary blade 145 is also the same in the first example although not described in the first example.

A dust discharge member 545 is formed on the rear portion of the blade case 144 for discharging the cutting chips that are blown into the blade case 144. The dust discharge member 545 is coupled to a dust guide device 160 that defines a dust transfer passage as will be explained later. Thus, the inner space of the blade case 144 serves to receive the flow of air produced by the rotation of the rotary blade 145, and the cutting chips drawn into the blade case 144 by the flow of air are discharged into the dust guide device 160 via the dust discharge member 545. Further, the blade case 144 is provided with a communication passage portion 546 communicating with the dust discharge member 545 and extending rearward from the dust discharge member 545. One end of a second transfer tubular member 171 that will be explained later is connected to the communication passage portion 546.

The rotary blade 145 having a disk-shape may have saw teeth formed at its circumferential edge and can cut into the workpiece W as it rotates. In this example, the rotary blade 145 rotates in a clockwise direction as viewed in FIG. 14. Thus, as the rotary blade 145 rotates, the saw tooth cut into the workpiece W in a direction from its lower side toward the upper side. Therefore, the air is drawn from around the table 120 into the blade case 144 as described above, so that the cutting chips are drawn together with the air into the blade case 144. This mechanism of cutting the workpiece W by the rotary blade 145 and of drawing the cutting chips together with the air is also the same in the first example although not described in the first example.

The reference numeral 146 denotes a movable cover (safety cover) that is biased by a spring (not shown) to normally cover the lower half of the rotary blade 145. More specifically, the movable cover 146 normally covers a portion of the rotary blade 145 that is opposed to the placement surface 121 of the table 120. When the rotary blade 145 rotates and cuts into the workpiece, the movable cover 146 moves to uncover the portion of the rotary blade 145 opposed to the placement surface 121. This movement of the movable cover 146 may be performed by using a link arm similar to the link arm 30 of the first example.

Figure 16:
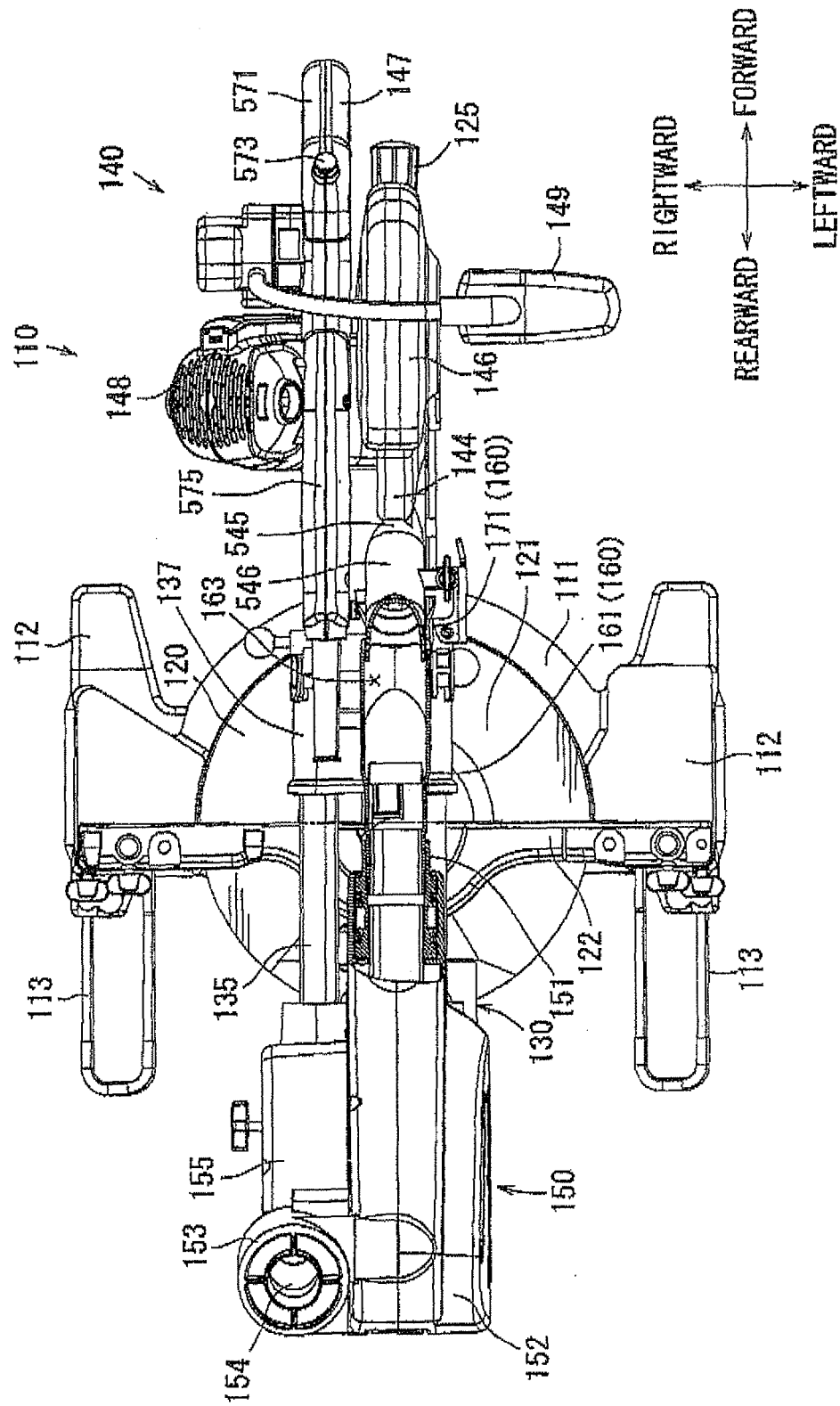
FIG. 16 is a plan view, with a part shown in a cross section, of the cutting device shown in FIG. 13.
Figure 17:
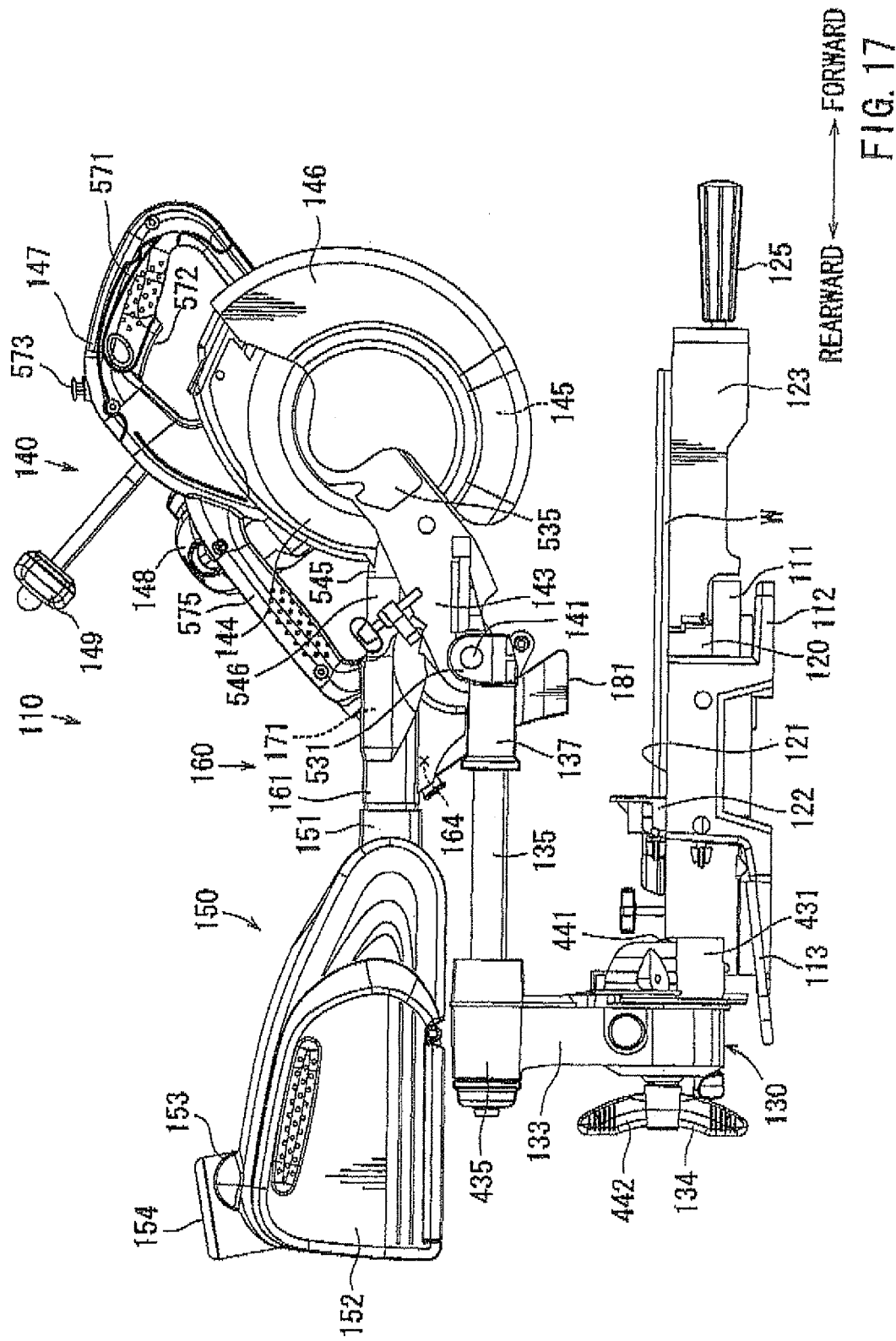
FIG. 17 is a side view of the cutting device shown in FIG. 13 when no cutting operation is performed.
Figure 18:
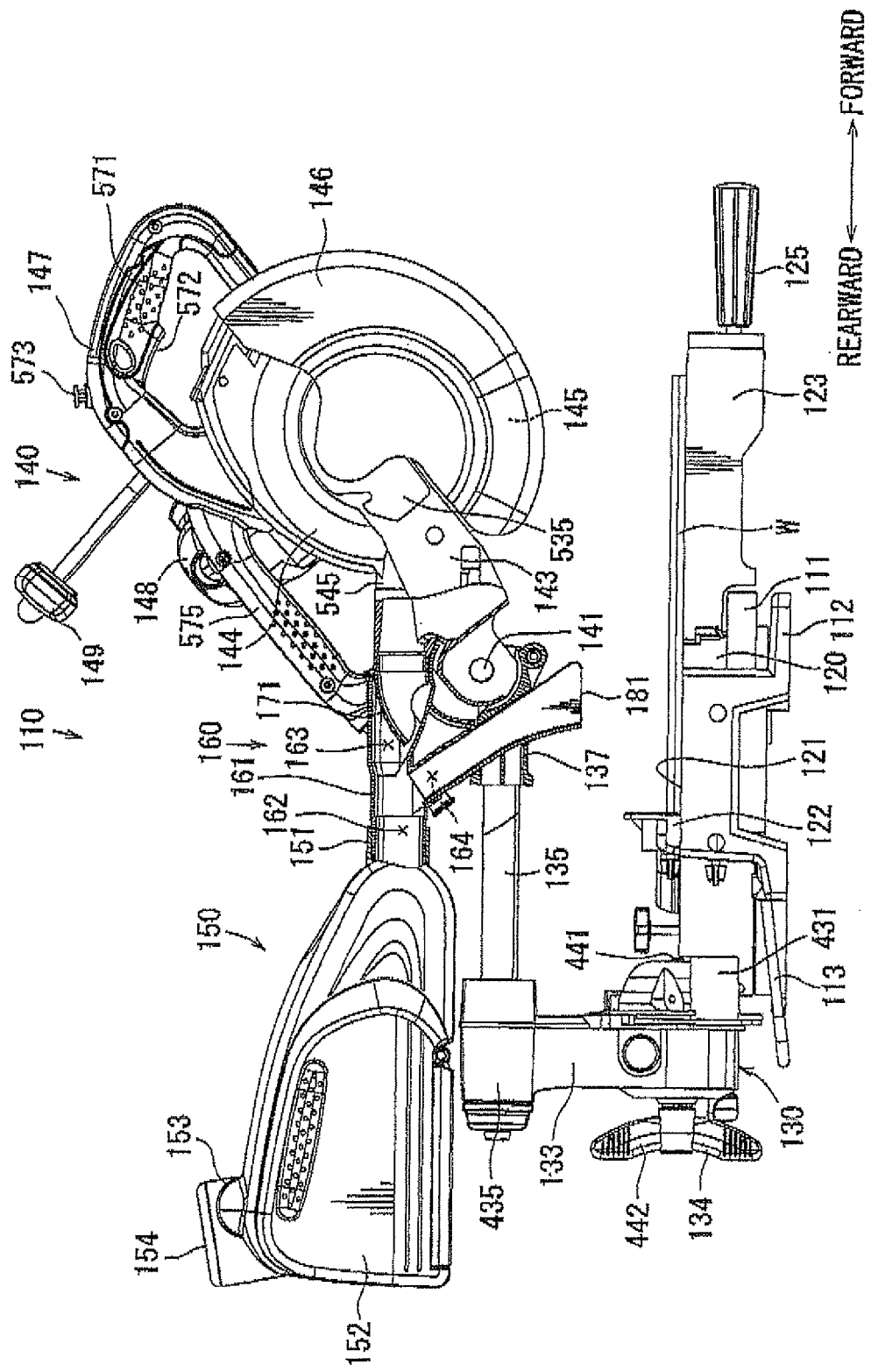
FIG. 18 is a side view similar to FIG. 17 with a part shown in a cross section.

The handle portion 147, the electric motor 148 and the lighting device 149 are disposed on the upper side of the unit case 535 as viewed in FIG. 16. More specifically, as shown in FIG. 17, the handle portion 147 is disposed on the upper side of the unit case 535 and is formed integrally with the unit case 535. The handle portion 147 is a portion adapted to be grasped by the operator. The handle portion 147 includes an operation handle portion 571 disposed on the front side of the cutting unit 140 and an auxiliary handle portion 575 disposed on the rear side of the cutting unit 140. Positions of these operation handle portion 571 and the auxiliary handle portion 575 are determined so as to be easily grasped by hands of the operator for sliding the cutting unit 140 relative to the placement surface 121 of the table 120 and for moving the rotary blade 145 toward and away from the placement surface 121. Here, a switch lever (operation trigger) 572 for rotatably driving the rotary blade 145 and a release button 573 for releasing restriction from operating the switch lever 572 are mounted to the operation handle portion 571.

The electric motor 148 is disposed adjacent to and on the upper side of the handle portion 147 as viewed in FIG. 16. The electric motor 148 produces a drive force for rotatably driving the rotary blade 145 by the operation of the switch lever 572. Although the internal construction of the electric motor 148 is not shown, the electric motor 148 includes an electric motor section for producing the drive force by the operation of the switch lever 572 and a speed reduction unit. The rotational drive force produced by the electric motor section is transmitted to a rotary shaft or a spindle (not shown) of the rotary blade 145 via the reduction unit for rotating the rotary blade 145. On the front side of the electric motor 148 disposed as described above, the lighting device 149 is positioned for illuminating the cutting region of the workpiece W placed on the table 120.

A dust collecting box 150 for collecting the cutting chips discharged from the dust discharge member 545 will now be described. The dust connecting box 150 serves as a dust container and has a plurality of dust collecting chambers that can collect dust by utilizing a cyclone system.

The dust collecting box 150 may be of a known cyclone type dust box, such as a dust box 21 disclosed in Japanese Laid-Open Patent Publication No. 2006-159777. As shown in FIGS. 14 and 16, the dust collecting box 150 includes a box connecting member 151, into which cutting chips discharged from the dust discharge member 545 enter, a first storage chamber 152 connected to and communicating with the box connection member 151, a second storage chamber 153 connected to and communicating with the first storage chamber 152, and a third storage chamber 155 (see FIG. 16) connected to and communication with the second storage chamber 153. The second storage chamber 153 has a discharge opening 154 for discharging air that flows from the box connecting member 151 into the second storage chamber 153 after passing through the first storage chamber 152. The dust collecting box 150 is configured such that the cutting chips are collected within the first storage chamber 152 and the second storage chamber 153 as the air containing the cutting chips flows through the box connecting member 151, the first storage chamber 152 and the second storage chamber 153 in this order. The dust collecting box 150 configured in this way is disposed adjacent to and on the upper side of the slide mechanism 130. More specifically, the box connecting member 151 is connected to the first transfer tubular member 161 of the dust guide device 160, so that the dust collecting box 150 is fixedly supported on the slider 137 (i.e., the slide mechanism 130).

Figure 19:
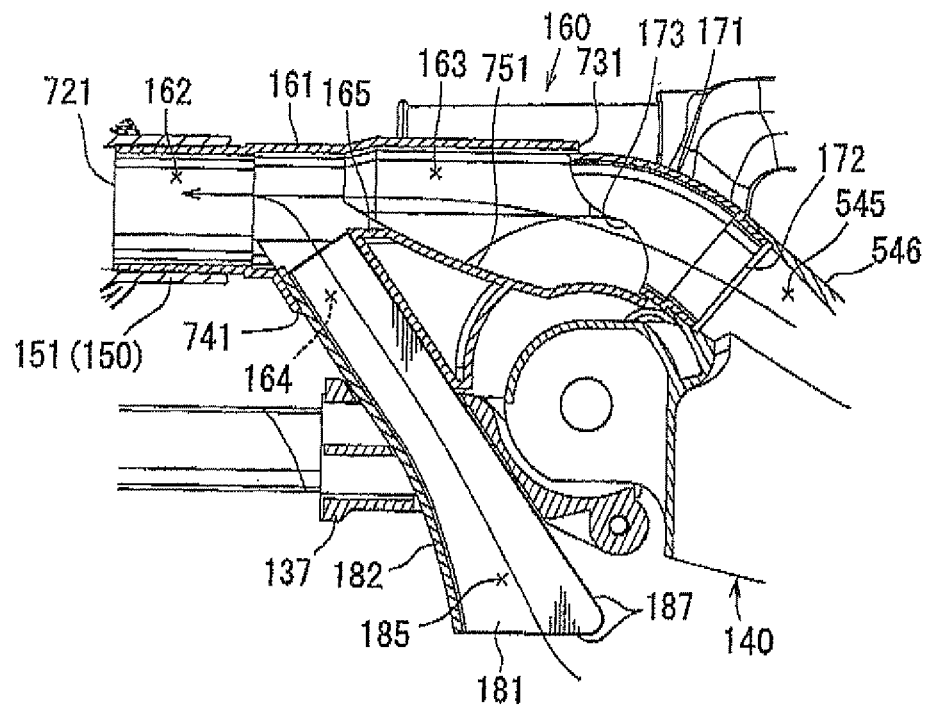
FIG. 19 is an enlarged sectional view of a dust guide device of the cutting device shown in FIG. 13 when a cutting operation is performed.
Figure 20:
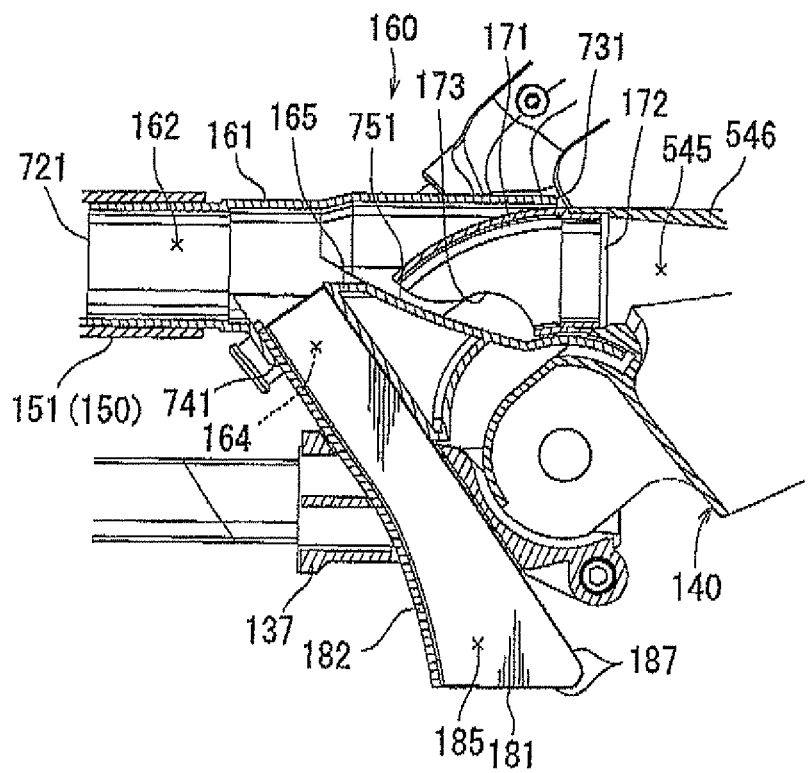
FIG. 20 is an enlarged sectional view of the dust guide device when no cutting operation is performed.

The dust guide device 160 will now be described. As shown in FIG. 15, the dust guide device 160 is configured to provide a transfer passage for transferring the cutting chips from the dust discharge member 545 into the dust collecting box 150. In other words, the dust guide device 160 guide the cutting chips blown into the blade case 144 to the outside of the blade case 144. To this end, the dust guide device 160 is provided between the dust discharge member 545 and the dust collecting box 150 and is connected to the dust discharge member 545 and the dust collecting box 150. FIG. 19 corresponds to FIG. 15 and shows an enlarged sectional view of the dust guide device 160 during the cutting operation. FIG. 20 corresponds to FIG. 18 and shows an enlarged sectional view of the dust guide device 160 when no cutting operation is performed.

As shown in FIGS. 19 and 20, the dust guide device 160 serving as a transfer passage forming device includes the first transfer tubular member 161 having one end connected to the side of the dust collecting box 150, and a second transfer tubular member 171 having one end connected to the side of the dust discharge member 545. The first transfer tubular member 161 serves as a first transfer passage forming member, and the second tubular member 171 serves as a second transfer passage forming member.

Figure 21:
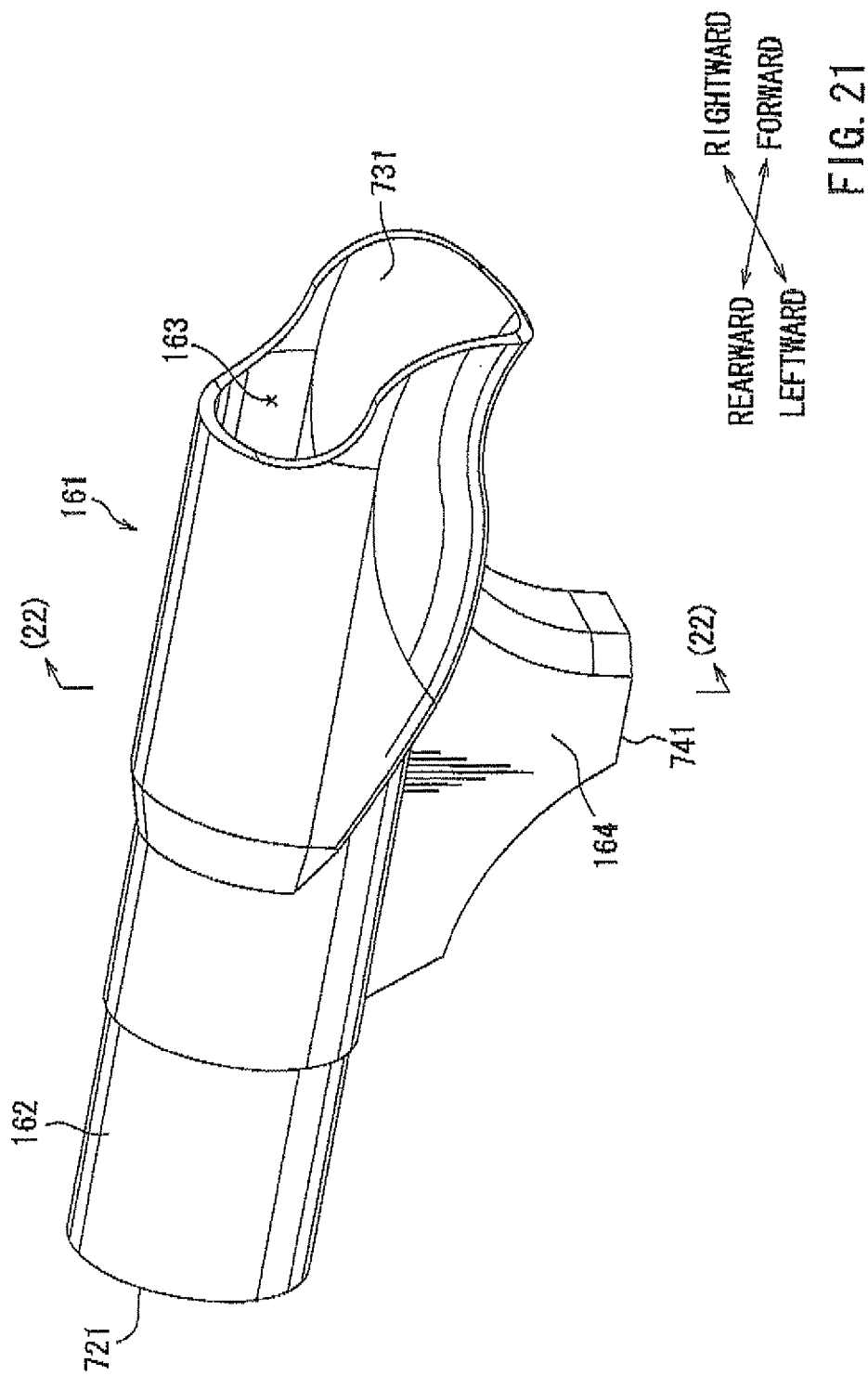
FIG. 21 is an enlarged perspective view of a first transfer tubular member of the dust collecting guide device.
Figure 22:
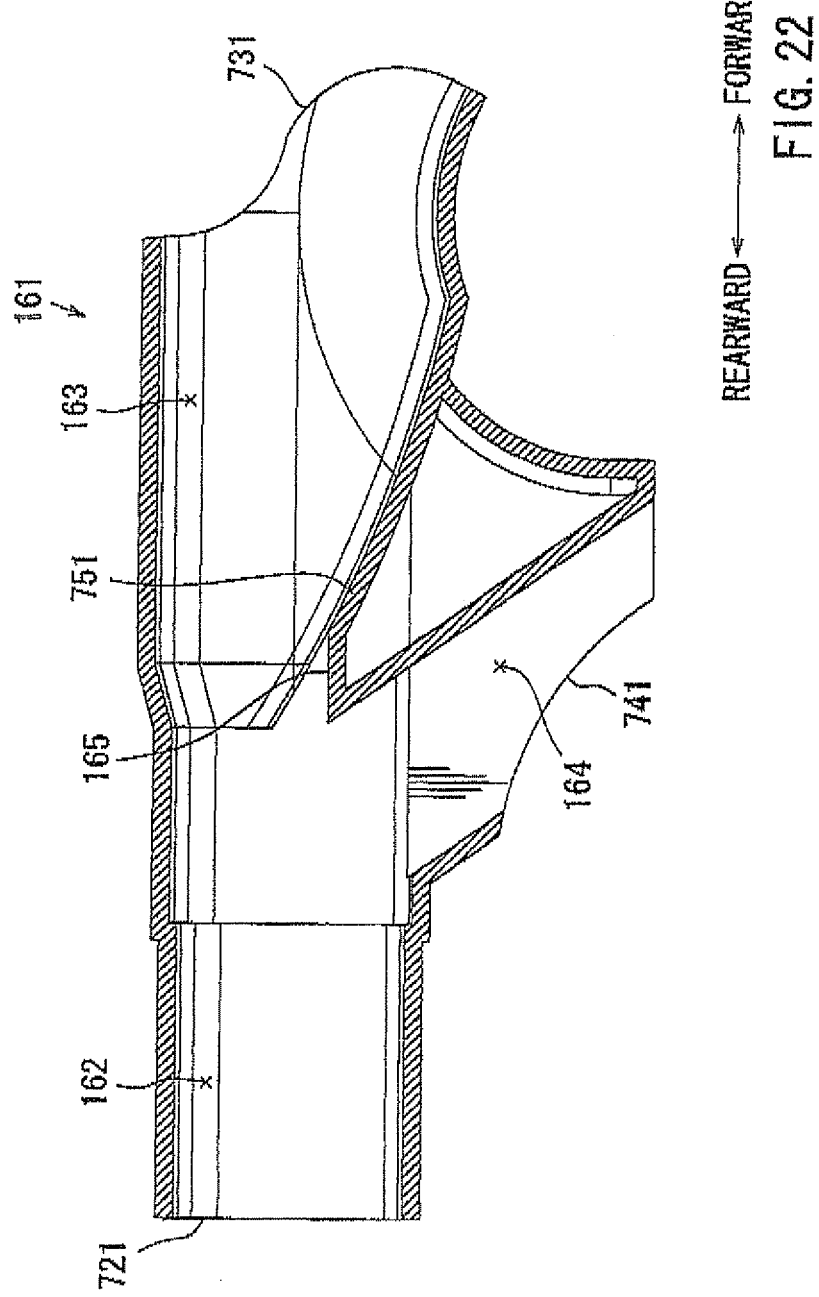
FIG. 22 is a sectional view taken along line (22)-(22) in FIG. 21 of the first transfer tubular member.
Figure 23:
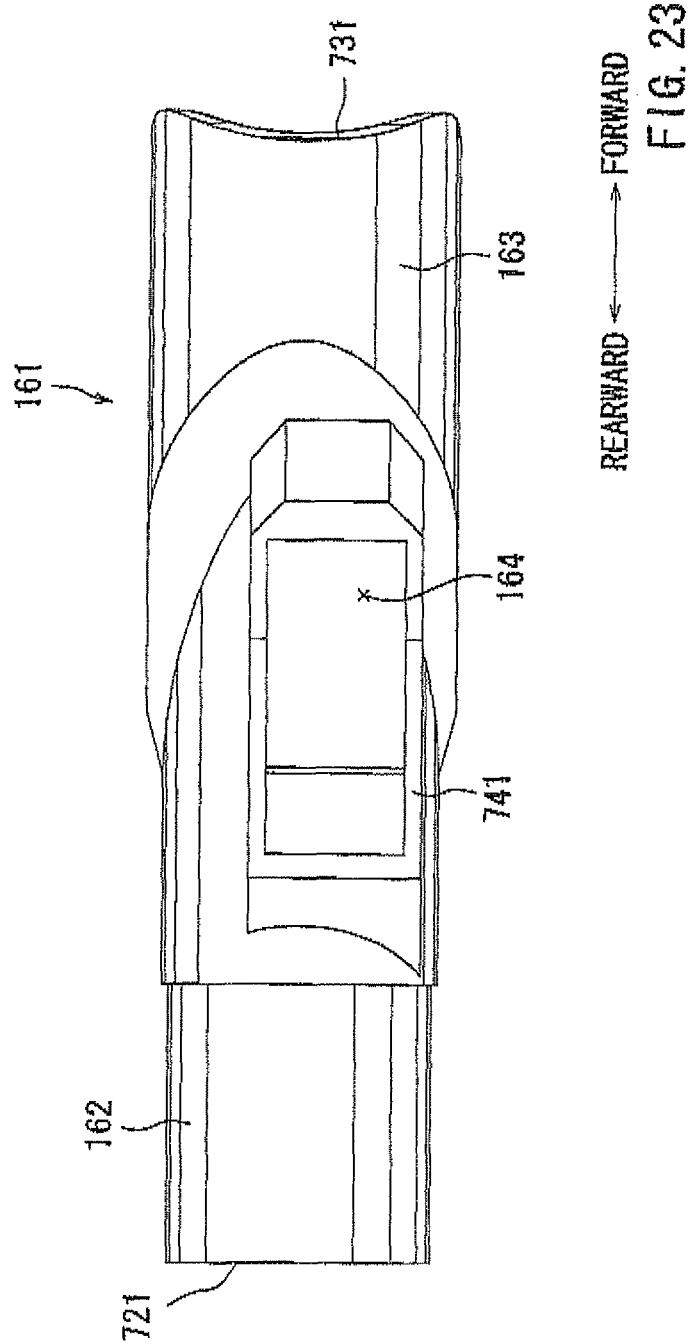
FIG. 23 is a bottom view of the first transfer tubular member of the dust collecting guide device shown in FIG. 21.

The first transfer tubular member 161 will now be described with reference to FIGS. 21 to 23. As shown in FIGS. 19 and 20, the one end of the first transfer tubular member 161 is connected to the box connecting member 151 of the dust collecting box 150. To this end, as shown in FIGS. 21 to 23, the first transfer tubular member 161 has a box-side connecting port 721 disposed on the side of its one end. The box-side connecting port 721 communicates with a primary transfer passage 162 defined within the first transfer tubular member 161 and also communicates with the box connecting member 151. On the other hand, the first transfer tubular member 161 is formed with two transfer passages that are branched from the primary transfer passage 162. One of the two transfer passages branched from the primary transfer passage 162 is a first transfer passage 163 communicating within the second transfer tubular member 171. The other of the two transfer passages is a second transfer passage 164 communicating within a third transfer member 181.

The other end of the first transfer passage 163 communicating with the primary transfer passage 162 is configured as a receiving port 731 for receiving the second transfer tabular member 171. The receiving port 731 at the other end of the first transfer passage 163 corresponds to the other end of the first transfer tubular member 161. As shown in FIG. 21, the receiving port 731 communicating with the first transfer passage 163 is formed to have an upper side open edge that is offset rearwardly of a lower side open edge. A portion of the first transfer tubular member 161 adjacent to the lower side open edge of the receiving port 731 is formed to have an upwardly convex arc shape while being inclined downwardly toward the front side. With this configuration of the receiving port 731, it is possible to reduce the clearance that may be formed between the receiving port 731 and the second transfer tubular member 171 when the second transfer tubular member 171 is inserted into the receiving port 731 as will be explained later. In addition, the receiving port 731 allows the pivotal movement of the second transfer tubular member 171 from the position shown in FIG. 19 to the position shown in FIG. 20. Here, the primary transfer passage 162 and the first transfer passage 163 formed in continuation with the primary transfer passage 162 are configured to extend in line with each other in the horizontal direction.

On the other hand, the second transfer passage 164 extends in a direction of intersecting with the extending direction of the primary transfer passage 162 and the other end of the second transfer passage 164 is formed as a connection port 741, into which the third transfer member 181 is inserted. The second transfer passage 164 having the connection port 741 is configured to be inclined downwardly in the forward direction. The connection port 741 of the second transfer passage 164 is connected to the upper end of the third transfer member 181 by a suitable connecting device, such as screws, so that the inside of the second transfer tubular member 164 and the inside of third transfer member 181 communicate with each other.

As described above, the first transfer passage 163 and the second transfer passage 164 are formed in the first transfer tubular member 161. To this end, a branch wall 165 is formed between the first transfer passage 163 and the second transfer passage 164 for partly defining the first transfer passage 163 and the second transfer passage 164 and separating these passages from each other. The branch wall 165 may be suitably hollowed for reducing the weight of the first transfer tubular member 161. A wall portion 751 of the first transfer passage 163 formed by the branch wall 165 is configured to be inclined upward in the rearward direction. The wall portion 751 also serves as a rib extending in a direction opposite to the extending direction of the third transfer member 181, which coincides with the extending direction of the second transfer passage 164.

The first transfer tubular member 161 configured as described above is fixedly mounted to the slider 137 independently of the cutting unit 140. More specifically, the branch wall 165 of the first transfer tubular member 137 is joined to the slider 137, so that the branch wall 165 is fixedly supported on the slider 137. Therefore, regardless of the pivotal movement of the cutting unit 140, the first transfer tubular member 161 is always positioned at an initial position that is set when fixedly supported on the slider 137.

Figure 25:
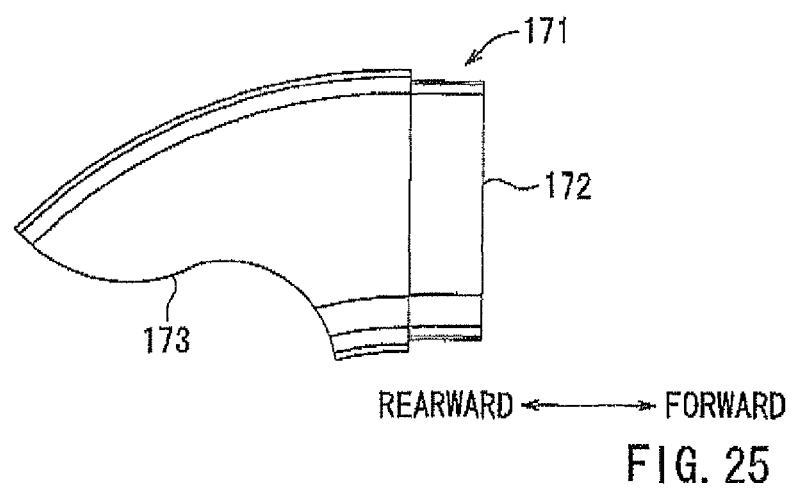
FIG. 25 is a side view of the second transfer tubular member shown in FIG. 24.
Figure 26:
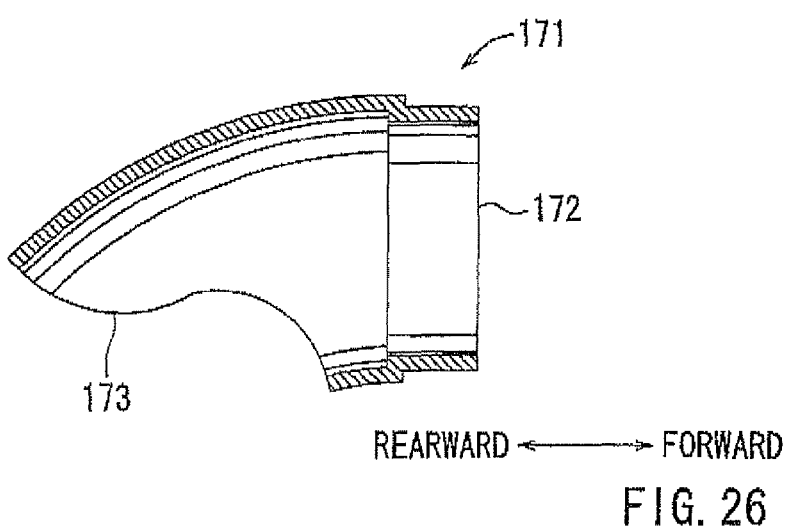
FIG. 26 is a sectional view taken along line (26)-(26) of the second transfer tubular member shown in FIG. 24.

The second transfer tubular member 171 will now be described with reference to FIGS. 24 to 26. As shown in FIGS. 19 and 20, one end having a communication-side connecting port 172 of the second transfer tubular member 171 is connected to the side of the dust discharge member 545. More specifically, the one end having the communication-side connecting port 172 is connected the communication passage portion 546 that communicates with the dust discharge member 545.

Figure 24:
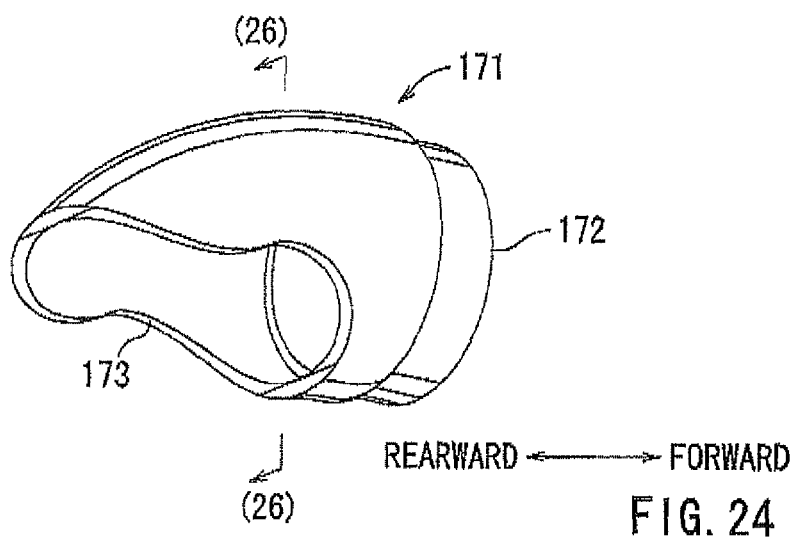
FIG. 24 is an enlarged perspective view of a second transfer tubular member of the dust collecting guide device.

As shown in FIG. 24, the upper portion of the second transfer tubular member 171 is configured to have an upwardly convex arc shape and the lower portion of the same is configured to be suitably cut out. The second transfer tubular member 171 is formed with the communication-side connection port 172 on its one end and is formed with an insertion port 173 on its the other end. The communication-side connection port 172 is formed to define a circular opening. On the other hand, the insertion port 173 is formed to define an opening opened in a direction intersecting with the open direction of the communication-side connection port 172. The communication-side connection port 172 is fixed to the blade case 144 by being connected the communication passage portion 546 in communication therewith. Thus, the second transfer tubular member 171 is fixedly supported on the blade case 144 in a state of communicating with the communication passage portion 546. Therefore, as shown in FIGS. 19 and 20, the second transfer tubular member 171 moves vertically together with the cutting unit 140 as the cutting unit 140 pivots. Hence, the second transfer tubular member 171 pivots relative to the first transfer tubular member 161. Here, as described above, the upper portion of the second transfer tubular member 171 is formed to have an arcuate surface and the lower portion is formed to be cut out. Therefore, it is possible to reduce the clearance that may be formed between the receiving port 731 and the second transfer tubular member 171. In addition, as the second transfer tubular member 171 pivots relative to the first transfer tubular member 161 from the position shown in FIG. 19 to the position shown in FIG. 20, the receiving port 731 moves into the first transfer tubular portion 161 to allow pivotal movement of the second transfer tubular member 171. In other words, the receiving port 731 at the other end of the first transfer tubular member 161 and the insertion port 173 at the other end of the second transfer tubular member 171 are coupled to each other such that they can move relative to each other in response to the pivotal movement of the cutting unit 140. Thus, the second transfer tubular member 171 is slidably fitted into the first transfer tubular member 161, and the fitting amount of the second transfer tubular member 171 into the first transfer tubular member 161 varies with change of the position of the dust discharge member 545 relative to the dust collecting box 150, so that the coupling condition (communicating condition) of the second transfer tubular member 171 to the first transfer tubular member 161 is maintained. More specifically, the outer diameter of the second transfer tubular member 171 is set to be smaller than the inner diameter of the first transfer tubular member 161, so that the second transfer tubular member 171 can be slidably fitted into the first transfer tubular member 161.

In this way, the coupling condition of the second transfer tubular member 171 to the first transfer tubular member 161 is maintained because the fitting amount of the second transfer tubular member 171 into the first transfer tubular member 161 varies with change of the position of the dust discharge member 545 relative to the dust collecting box 150. Further, when the cutting unit 140 has moved downward to the cutting position (lowermost position), the insertion port 173 of the second transfer tubular member 171 is positioned to enter the receiving port 731 of the first transfer tubular member 161 by a little distance. Therefore, in this position, the sectional area of the flow path may not substantially change from the first transfer tubular member 161 to the second transfer tubular member 171. On the other hand, when the cutting unit 140 is positioned at a rest position where the dust discharge member 545 is positioned at its highest position as shown in FIG. 20, the second transfer tubular member 171 extends in line with the extending direction of the first transfer tubular member 161 same as the primary transfer passage 162 and the first transfer passage 163 extending in line with the primary transfer passage 162.

Figure 27:
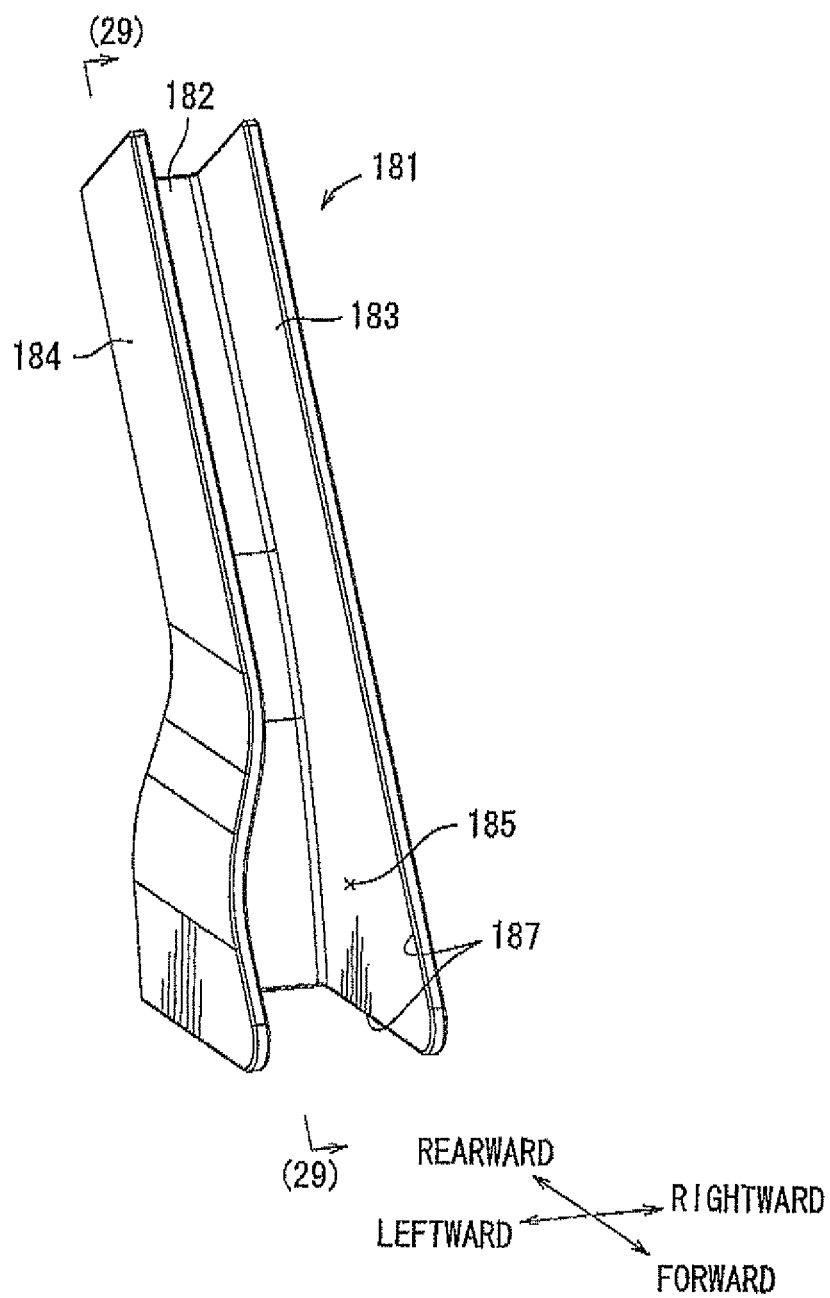
FIG. 27 is an enlarged perspective view of a third transfer member of the dust collecting guide device.
Figure 28:
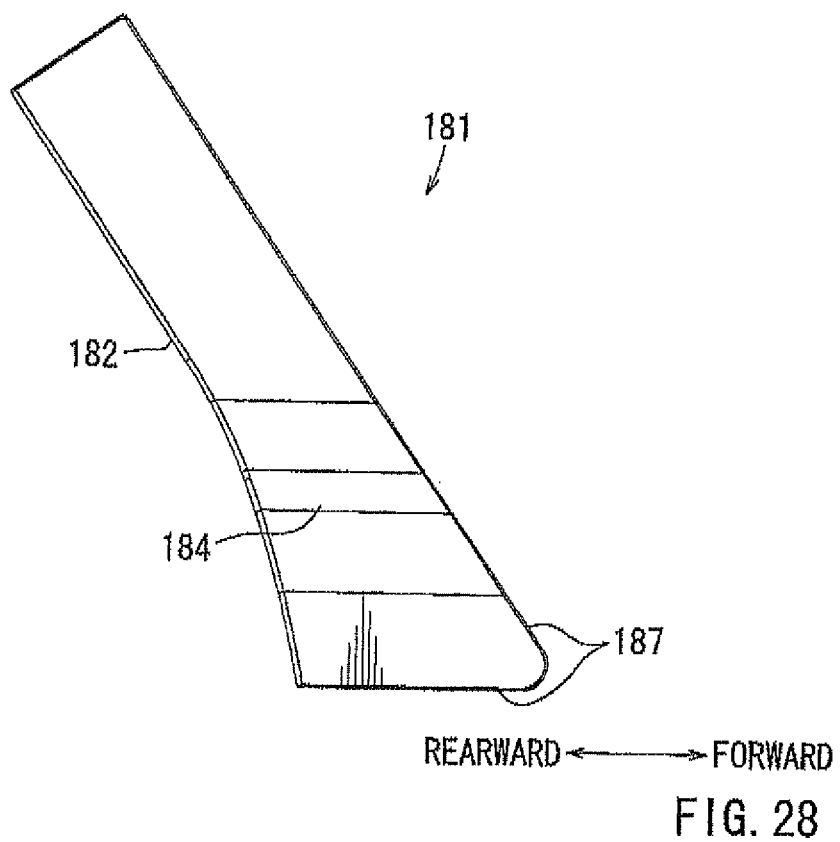
FIG. 28 is a side of the third transfer member shown in FIG. 28.
Figure 29:
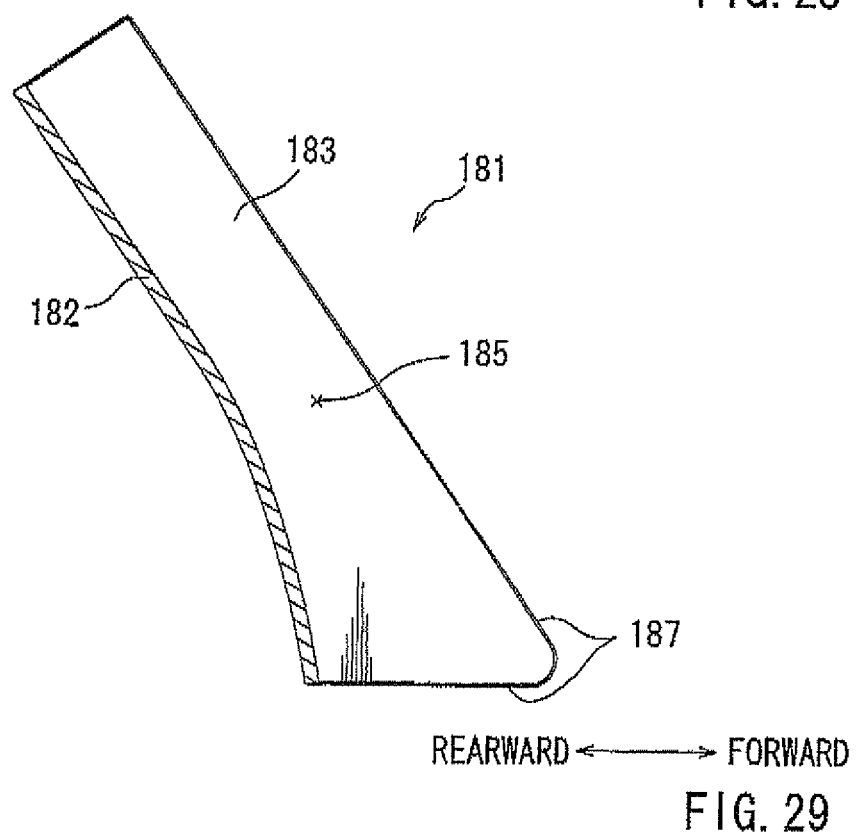
FIG. 29 is a sectional view taken along line (29)-(29) of the third transfer member shown in FIG. 27.

The third transfer member 181 will now be described with reference to FIGS. 27 to 29. As shown in FIGS. 14 and 15, the third transfer member 181 is mounted to the first transfer tubular member 161 in order to collect cutting chips that are produced during the cutting operation of the workpiece W but are scattered to the outside of the blade case 144 without entering the blade case 144. To this end, the third transfer member 181 is formed with an opening 187 opened for drawing cutting chips scattered to the outside of the blade case 144 while the third transfer member 181 is in communication with the second transfer passage 164 of the first transfer tubular member 161. More specifically, as shown in FIG. 27, the third transfer member 181 includes a rear wall 182 extending obliquely relative to the vertical direction and a right side wall 183 and a left side wall 184 extending from opposite side edges of the rear wall 182 in a direction intersecting with the rear wall 182. In this example, the right and left side walls 183 and 184 extend forwardly from the rear wall 182. More specifically, as shown in FIGS. 19 and 20, the lower portion of each of the right and left side walls 183 and 184 has a width that becomes larger in a downward direction. Therefore, as shown in FIG. 27, the third transfer member 181 is configured to have a U-shape as viewed from the upper side and is opened at its upper side, the lower side and the front side. Here, the upper portion of the third transfer member 181 is configured to be able to be inserted into the connection port 741 of the first transfer tubular member 161 for enabling communication of the third transfer member 181 with the second transfer passage 164. On the other hand, the lower side and the front side of the lower portion of the third transfer member 181 define the dust collecting opening 187 for collecting the cutting chips scattered to the outside of the blade case 144. A space positioned between the dust collecting opening 187 and the rear wall 182 is formed as a transfer passage 185 for the scattered cutting chips. Here, the size and the position of the dust collecting opening 187 are set to corresponding to the scattering area of the cutting chips of the workpiece W in order to adequately draw the cutting chips even in the case that the workpiece W has a thin thickness. The flow of air within the third transfer member 181 is caused by the negative pressure produced by the flow of the air flowing from within the blade case 144 into the dust guide device 160 via the dust discharge member 545, so that the air flows within the third transfer member 181 in a direction indicated by an arrow in FIG. 19. Therefore, the cutting chips can be drawn into the third transfer member 181 via the dust collecting opening 187.

The third transfer member 181 configured as described above is fixedly connected to the connection port 741 of the first transfer tubular member 161 by means of a suitable connecting device, such as screws, for communication therewith. The connection port 741 is provided at the other end of the second transfer passage 164 of the first transfer tubular member 161. By fixedly connecting the third transfer member 181 to the first transfer tubular member 161, the third transfer member 181 is fixedly mounted to the slider 137 because the first transfer tubular member 161 is fixedly mounted to the slider 137. Therefore, as with the first transfer tubular member 161 described above, regardless of the pivotal movement of the cutting unit 140, the third transfer member 181 is always positioned at an initial position that is set when supported on the slider 137.

According to the cutting device 110 of the fourth example described above, the connecting condition between the first transfer tubular member 161 and the second transfer tubular member 171 can be maintained regardless of the position of the cutting unit 140 that is vertically pivoted. When the cutting unit 140 is positioned at the lowermost position, only the second transfer tubular member 171 of the first and second transfer tubular members 161 and 171 for transferring the cutting chips may incline downward toward the dust discharge member 545. Thus, because the first transfer tubular portion 161 is fixedly supported on the slider 137 of the slide mechanism 130, the first transfer tubular portion 161 can be maintained in position regardless of the pivotal position of the cutting unit 140. Therefore, even in the case that the flow of air from the dust discharge member 545 toward the dust collecting box 150 is stopped due to stop of the rotation of the rotary blade 145, only the cutting chips within the second transfer tubular member 171 of the first and second transfer tubular members 161 and 171 may cause movement of the cutting chips contained therein due to the gravity. In general, in order to carry the cutting device 110 after the cutting operation, the cutting unit 140 is positioned at its lowermost position with the rotation of the rotary blade 145 stopped and is then locked at the lowermost position. According to the fourth example, it is possible to minimize the occurrence of dropping of the cutting chips from the dust discharge member 545 onto the table 120 by the gravity during transportation of the cutting device 110.

Further according to the cutting device 110, the third transfer member 181 is mounted to the first transfer tubular member 161 for drawing the cutting chips from the dust collecting opening 187 into the first transfer tubular member 181. The dust collecting opening 187 can receive the cutting chips that are produced during the cutting operation and are scattered to the outside of the blade case 144 without entering the blade case 144. Therefore, for example, in the case that the workpiece W has a thin thickness, the cutting chips scattered to the outside of the blade case 144 without entering the blade case 144 can be drawn into the first transfer tubular member 161 from the third transfer member 181 having the dust collecting opening 187. Therefore, the cutting chips produced at the cutting region by the cutting operation can be favorably collected. As a result it is possible to maintain a work environment at a favorable condition, and it is possible to favorably maintain the operability.

Further, according to the cutting device 110 of the fourth example, the first transfer tubular member 161 extends substantially horizontally. Therefore, in comparison with the second transfer tubular member 171, the first transfer tubular member 161 can reliably hold the cutting chips not to be dropped by the gravity force. Therefore, it is possible to limit the occurrence of dropping of the cutting chips (from the dust discharge member 545 onto the table 120 by the gravity) to only from the second transfer tubular member 171. Therefore, the occurrence of dropping of the cutting chips can be minimized.

Furthermore, according to the cutting device 110 of the fourth example, the fitting amount of the second transfer tubular member 171 into the first transfer tubular member 161 varies with change of the position of the dust discharge member 545 relative to the dust collecting box 150. Therefore, the first and second transfer tubular members 161 and 171 can be constituted by only two parts. Hence, it is possible to minimize the number of parts necessary for constituting the first and second transfer tubular members 161 and 171, and therefore, it is possible to reduce the manufacturing cost.

Furthermore, according to the cutting device 110 of the fourth example, in the fitting structure between the second transfer tubular member 171 and the first transfer tubular member 161, the outer diameter of the second transfer tubular member 171 is set to be smaller than the inner diameter of the first transfer tubular member 161, so that the second transfer tubular member 171 is fitted into the first transfer tubular member 161. Therefore, the clearance that may be produced between the second transfer tubular member 171 and the first transfer tubular member 161 is positioned proximal to the outer circumference of the second transfer tubular member 171 and is opened toward a direction opposite to the direction of flow of air produced by the rotation of the rotary blade 145. As a result, it is possible to minimize the leakage of air produced by the rotation of the rotary blade 145 and flowing from the second transfer tubular member 171 into the first transfer tubular member 161, and eventually, it is possible to minimize the leakage of cutting chips to the outside.

Furthermore, according to the cutting device 110 of the fourth example, in the case that the dust discharge member 545 is positioned at its highest position, the second transfer tubular member 171 extends in line with the extending direction of the first transfer tubular member 161. Therefore, when the cutting unit 140 is pivoted to the rest position where the dust discharge member 545 is positioned at its highest position, the second transfer tubular member 171 extends in line with the first transfer tubular member 161. Therefore, it is possible to increase the horizontal length of the transfer passage formed by the first and second transfer tubular members 161 and 171. Hence, it is possible to increase the horizontal moving distance of cutting chips. As a result, it is possible to minimize the occurrence of dropping of the cutting chips existing within the first and second transfer tabular members 161 and 171 from the dust discharge member 545 to the outside even in the case that the rotation of the rotary blade 145 is stopped and no flow of air is produced.

Furthermore, according to the cutting device 110 of the fourth example, the wall portion (branch wall 165) is disposed within the first transfer tubular member 161 and serves as an internal rib extending in a direction opposite to the extending direction of the third transfer member 181. Therefore, even in the case that the cutting chips passing through the first transfer tubular member 161 move adversely, the cutting chips are prevented from moving through the third transfer member 181 to be discharged to the outside from the dust collecting opening 187 because the adverse movement of the cutting chips can be blocked by the internal rib. Therefore, it is possible to minimize the occurrence of discharge of the cutting chips existing within the first transfer tubular member 161 from the dust collecting opening 187 also in this respect.

The first to fourth examples have been described in connection with the cutting devices 1 and 110 that are configured as slide-type cutting devices. However, the above teachings of the first to fourth examples can also be applied to a cutting device having no slide mechanism for a cutting unit or to a cutting device having no slide mechanism and no left and right pivot mechanisms for a cutting unit but having only a vertical pivot mechanism for the cutting unit. Further, in the first to fourth examples, the cutting devices 1 and 110 have circular saw blades as the rotary blades 14 and 145 for cutting the workpiece. However, the rotary blades 14 and 145 may not be limited to the circular saw blades but may be rotary grinding wheels or the like.

Further, in the cutting device 110 according to the fourth example, the fitting structure of the second transfer tubular member 171 into the first transfer tubular member 161 is configured to fit the second transfer tubular member 171 into the first transfer tubular member 161 by forming the outer diameter of the second transfer tubular member 171 to be smaller than the inner diameter of the first transfer tubular member 161. The fitting structure may not be limited to this configuration. Further, in order to couple the second transfer tubular member 171 to the first transfer tubular member 161, any other coupling structure than the fitting structure can be used as long as the movement of the second transfer tubular member 161 relative to the first transfer tubular member 171 is allowed. For example, an expansion joint structure can be used.

Furthermore, both of the dust guide device of any one of the first to third examples and the dust guide device of the fourth example can be assembled into the same cutting device.

What is claimed is:

1. A cutting device comprising:
a cutting unit having a rotary blade;
a table for placing a workpiece thereon;
a support device vertically movably supporting the cutting unit relative to the table, the cutting unit including:
  a blade case covering an upper portion of the rotary blade and having a dust discharge member; and
  a movable cover covering a lower portion of the rotary blade and opened and closed in response to the vertical movement of the cutting unit,
a dust guide device including a dust guide member covering an edge portion of the rotary blade exposed as the movable cover is opened, the dust guide member serving to guide dust produced at a cutting region toward the dust discharge member of the blade case; and
a dust guide moving device moving the dust guide member in a direction of extending downward from a lower portion of the blade case as the cutting unit moves downward, wherein:
  the dust guide member is vertically pivotally connected to the support device about a first pivotal axis,
  the cutting unit is vertically pivotally connected to the support device about a second pivotal axis,
  the first pivotal axis is located at a position lower than the second pivotal axis,
  the dust guide member includes a first end portion pivotally connected to the support device about the first pivotal axis and a second end portion opposite to the first end portion, and
  the second end portion is coupled to the blade case via a guide mechanism that includes a guide projection and a guide surface engaging the guide projection, the guide projection being provided on one of the second end portion and the blade case, and the guide surface being provided on the other of the second end portion and the blade case.

2. A cutting device comprising:
a cutting unit having a rotary blade;
a table for placing a workpiece thereon; and
a support device vertically movably supporting the cutting unit relative to the table, wherein:
the cutting unit includes:
a blade case covering an upper portion of the rotary blade and having a dust discharge member for discharging dust produced at a cutting region; and
a dust guide device disposed on an upstream side or a downstream side of the dust discharge member with respect to a flow of the dust, wherein:
  a position of at least a part of the dust guide device changes relative to the dust discharge member according to change of the vertical position of the cutting unit,
  the dust guide device is vertically pivotally connected to the support device about a first pivotal axis,
  the cutting unit is vertically pivotally connected to the support device about a second pivotal axis,
  the first pivotal axis is located at a position lower than the second pivotal axis, the dust guide device includes a dust guide member that includes a first end portion pivotally connected to the support device about the first pivotal axis and a second end portion opposite to the first end portion, and the second end portion is coupled to the blade case via a guide mechanism that includes a guide projection and a guide surface engaging the guide projection, the guide projection being provided on one of the second end portion and the blade case, and the guide surface being provided on the other of the second end portion and the blade case.

3. The cutting device as in claim 2, wherein the dust guide member is disposed on the upstream side of the dust discharge member, and a position of the dust guide member changes relative to the dust discharge member according to change of the vertical position of the cutting unit.

4. A cutting device comprising:

a cutting unit having a rotary blade;

a table for placing a workpiece thereon;

a support device vertically movably supporting the cutting unit relative to the table, the cutting unit including:

a blade case covering an upper portion of the rotary blade and having a dust discharge member; and a movable cover covering a lower portion of the rotary blade and opened and closed in response to the vertical movement of the cutting unit, a dust guide device including a dust guide member covering an edge portion of the rotary blade exposed as the movable cover is opened, the dust guide member serving to guide dust produced at a cutting region toward the dust discharge member of the blade case;

a dust guide moving device moving the dust guide member in a direction of extending downward from a lower portion of the blade case as the cutting unit moves downward; and a link arm interposed between the movable cover and the support device, wherein:

the dust guide member is vertically pivotally connected to the support device about a first pivotal axis, through the link arm, the movable cover is opened in response to the downward movement of the cutting unit and is closed in response to the upward movement of the cutting unit, the link arm has one end vertically pivotally supported on the cutting unit and has the other end engaging with the movable cover, the link arm having a guide recess disposed at a midway position in a longitudinal direction thereof, and the guide recess engaging a guide projection provided at the blade case, so that the link arm shifts vertically to open and close the movable cover in response to the vertical movement of the cutting unit, and the dust guide moving device includes a guide wall provided on the dust guide member and engaging the guide projection from an upper side, so that, while being allowed to retract upward, the dust guide member shifts downward and moves toward the edge portion as the guide projection shifts downward.

5. The cutting device as in claim 4, wherein the dust guide moving device allows the dust guide member to move upward relative to the cutting unit during the downward movement of the cutting unit or during stopping of the downward movement of the cutting unit.

6. The cutting device as in claim 4, wherein the dust guide moving device moves the dust guide member toward the rotary blade as the cutting unit moves downward.

7. The cutting device as in claim 4, further comprising a leaf spring biasing the dust guide member in a downwardly pivoting direction.

8. The cutting device as in claim 7, wherein the leaf spring is configured to provide a guide passage along which the dust flown into the dust guide member flows toward the dust discharge member.

9. The cutting device as in claim 4, wherein the dust guide device further includes a lower auxiliary guide member vertically pivotally supported and extending downward as the movable cover is opened.

10. The cutting device as in claim 9, wherein the lower auxiliary guide member includes an escape guide portion slidably contacts the workpiece for moving the lower auxiliary guide member upward as the cutting unit moves in a direction parallel to a surface of the workpiece.

11. The cutting device as in claim 4, wherein the dust guide device further includes an upper auxiliary guide member vertically pivotally supported and movable upward relative to the dust guide member to guide the dust toward the side of the dust discharge member as the dust guide member pivots downward.

* * * * *